US011846361B2

(12) United States Patent
Takezawa

(10) Patent No.: US 11,846,361 B2
(45) Date of Patent: Dec. 19, 2023

(54) SAFETY JOINT

(71) Applicant: TATSUNO CORPORATION, Tokyo (JP)

(72) Inventor: Masahiro Takezawa, Tokyo (JP)

(73) Assignee: Tatsuno Corporation, Tokyo (JP)

( * ) Notice: Subject to any disclaimer, the term of this patent is extended or adjusted under 35 U.S.C. 154(b) by 0 days.

(21) Appl. No.: 17/563,618

(22) Filed: Dec. 28, 2021

(65) Prior Publication Data

US 2022/0221076 A1    Jul. 14, 2022

(30) Foreign Application Priority Data

Jan. 14, 2021 (JP) .................................. 2021-003869

(51) Int. Cl.
*F16K 17/36* (2006.01)
*F17C 7/00* (2006.01)

(52) U.S. Cl.
CPC ................. *F16K 17/36* (2013.01); *F17C 7/00* (2013.01); *F17C 2205/0332* (2013.01); *F17C 2221/012* (2013.01); *F17C 2260/04* (2013.01); *F17C 2265/065* (2013.01); *F17C 2270/0184* (2013.01)

(58) Field of Classification Search
CPC .... F16K 17/36; F17C 7/00; F17C 2205/0332; F17C 2260/04; F17C 2265/065; F17C 2270/0184
USPC ....................................... 285/268; 137/68.14
See application file for complete search history.

(56) References Cited

U.S. PATENT DOCUMENTS

| 2,397,518 | A | * | 4/1946 | Allison | ..................... | F17D 5/04 |
| | | | | | | 137/67 |
| 2,637,572 | A | * | 5/1953 | Bruce | ................. | F16L 37/0848 |
| | | | | | | 251/340 |
| 3,319,642 | A | | 5/1967 | Fox | | |
| 5,538,189 | A | * | 7/1996 | Rodgers | .............. | F16L 27/0824 |
| | | | | | | 239/587.5 |

(Continued)

FOREIGN PATENT DOCUMENTS

| JP | 2006097874 A | 4/2006 |
| JP | 2007177990 A | 7/2007 |
| JP | 2015127555 A | 7/2015 |

OTHER PUBLICATIONS

Extended European Search Report for EP 22 15 1137; dated Apr. 27, 2022.

*Primary Examiner* — Angelisa L. Hicks
(74) *Attorney, Agent, or Firm* — Stetina Brunda Garred & Brucker

(57) ABSTRACT

To provide a safety joint that can immediately shut off a hydrogen gas flow path at the initial stage when a plug (nozzle side member) comes out of a socket (fueling apparatus side member) to prevent release of hydrogen gas. In a safety joint (100, 100-1, 100-2) when the plug (10) is disconnected from the socket (20), a plug side shutoff valve 5 and a socket side shutoff valve 24 close, a mechanism for closing the socket side shutoff valve (24) includes a socket side spring (23) for urging a socket side valve body (25), a socket side rod (22) connected to the socket side valve body (25), and a support member (26, 27, 28) for supporting (mounting) the socket side rod (22), the support member (26, 27, 28) moves, together with the plug (10), to a state that the support member (26, 27, 28) does not support (mount) the socket side rod (22) when the plug (10) is disconnected from the socket (20).

3 Claims, 15 Drawing Sheets

(56) References Cited

U.S. PATENT DOCUMENTS

| | | | |
|---|---|---|---|
| 6,511,100 B1* | 1/2003 | Le Clinche | F16L 37/23 |
| | | | 403/322.2 |
| 9,195,240 B2* | 11/2015 | Bishoff | G05D 16/0638 |
| 2010/0319690 A1* | 12/2010 | Cuzydlo | A61M 16/183 |
| | | | 137/614.04 |
| 2018/0172191 A1* | 6/2018 | Takezawa | F16L 27/06 |

* cited by examiner

SAFETY JOINT

CROSS-REFERENCE TO RELATED APPLICATIONS

The present application claims priority to JP2021-003869 filed on Jan. 14, 2021, the disclosure of which is incorporated herein by reference.

STATEMENT RE: FEDERALLY SPONSORED RESEARCH/DEVELOPMENT

Not Applicable

BACKGROUND

1. Technical Field

The present invention relates to a filling apparatus for filling gas such as hydrogen gas used as fuel. More particularly, the present invention relates to a pipe joint for safely separating the filling apparatus and a gas filling nozzle from each other in an emergency while a gas is filled with the filling apparatus.

2. Description of the Related Art

For example, as show in FIG. 14, to a vehicle A using hydrogen as fuel, at a hydrogen filling station is filled hydrogen gas after a filling nozzle 202 attached to an end of a filling hose 201 of a hydrogen filling apparatus 200 is connected to a vehicle side filling port 203. Then, this filling of hydrogen gas is performed while being controlled depending on the pressure of a hydrogen tank 204 mounted to the vehicle A. Here, when the vehicle A runs to pull the filling hose 201 while hydrogen gas is filled, for instance, parts such as the filling nozzle 202 and the filling hose 201 are broken to inject a hydrogen gas, so that it becomes a dangerous condition. Then, a pipe joint 300 for emergency releasing is mounted between the hydrogen filling apparatus 200 and the filling hose 201, and when to the filling hose 201 is applied a tensile force equal to or higher than a predetermined value, the pipe joint 300 for emergency releasing is divided to prevent the parts such as the filling nozzle 202 and the filling hose 201 from being broken.

As a prior art, the present applicant proposed a pipe joint for emergency releasing including: a cylindrical plug (filling nozzle side member) in which a flow path is formed; a cylindrical socket (filling apparatus side member) in which a flow path is formed; and when the plug is inserted into the socket, shutoff valves open the flow paths of the plug and the socket to communicate the flow paths with each other, and when the plug is detached from the socket, the shutoff valves close. In the pipe joint for emergency releasing, central axes of the flow paths of the plug and the socket do not form the same straight line; when the plug is inserted into the socket, an end of a socket side valve stem (an end, opposing the end of the socket side valve stem, of a valve element) contacts with a plug side rod accommodating case and a valve element mounted to the other side of the socket side valve stem is held at a position separated from a socket side valve seat against an elastic repulsive force of an elastic body on the socket side, and a locking member held in the plug side rod accommodating case is restricted to move radially outward by an inner wall at a socket body side opening, and a plug side valve stem contacts with the locking member and does not move toward the socket side, and a valve body provided on the plug side valve stem is held at a position separated from a plug side valve seat against an elastic repulsive force of an elastic body on the plug side (refer to Patent Document 1). This pipe joint (disclosed in the Patent Document 1) is useful.

However, in the pipe joint 100 of the prior art (described in the Patent Document 1), when a large tensile force acts on the filling hose 201 (shown in FIG. 14), at an initial stage of the process that the plug 10 is pulled out from the socket 22 (the stage at which the plug 10 starts to come out), as shown in FIG. 15, the socket side rod 22 connected to the valve body 25 on the socket 20 side is placed on the plug side valve stem 2 or a cover member 3 of the valve stem. Under the condition (the state shown in FIG. 15), the socket side valve body 25 positions separately from the socket side valve seat 21E against the elastic repulsive force of a spring 23 on the socket 20 side, which causes the socket side shutoff valve 24 to be held in an open state. For that reason, at the initial stage where the plug 10 is ejected from the socket 20 (the stage where the plug 10 is beginning to be ejected), a high-pressure hydrogen gas supplied from the filling apparatus 200 (FIG. 14) through the opening portion 21C on the socket 20 side flows out to the outside of the pipe joint 100 as a so-called "outgas". In FIG. 15, the outflow of the outgas is indicated by the arrow OG.

Prior Art document Japan Patent No. 6540967 gazette

BRIEF SUMMARY

The present invention has been made in consideration of the above problems in the prior art, and the object thereof is to provide a safety joint that can immediately shut off a hydrogen gas flow path at the initial stage when a plug, which is a nozzle side member, comes out of a socket, which is a filling apparatus side member, to prevent release of outgas.

A safety joint (100, 100-1, 100-2) of the present invention includes: a cylindrical nozzle side member (10: plug) with a flow path (1A: in-plug flow path) formed inside, a shutoff valve (5: plug side shutoff valve) of the nozzle side member (10) opens when the nozzle side member (10) is connected to a filling apparatus side member (20: socket); and the filling apparatus side member (20) with a cylindrical shape, a flow path (21A: socket side flow path) in communication with the flow path (1A: in-plug flow path) of the nozzle side member (10) is formed in the filling apparatus side member (20) and a shutoff valve (24: socket side shutoff valve) of the filling apparatus side member (20) opens when the filling apparatus side member (20) is connected to the nozzle side member (10); and when the nozzle side member (10) is disconnected from the filling apparatus side member (20), the shutoff valves (5, 24) of the nozzle side member (10) and the filling apparatus side member (20) close, the safety joint (100, 100-1, 100-2) (for emergency release) is characterized in that a mechanism for closing the shutoff valve (24: socket side shutoff valve) of the filling apparatus side member (20) includes: an elastic member (23: socket side spring), of the filling apparatus side member (20), for urging a filling apparatus side valve body (25: socket side valve body); a rod-shaped member (22: rod) connected to the filling apparatus side valve body (25); and a support member (26, 27, 28: rod support member) for supporting the rod-shaped member (22), wherein the support member (26, 27, 28) moves together with the nozzle side member (10) to a state where the support member (26, 27, 28) does not support (mount) the rod-shaped member (22) when the nozzle side member (10) is disconnected from the filling apparatus side member (20).

In the present invention, it is preferable that the support member (26) includes a disk-like member (26D) with a protrusion (26A) and a notch (26B), the disk-like member (26D) rotatably supported; an opening (3: groove) into which the protrusion (26A) of the disk-like member (26D) is inserted is formed on a protruding portion (3) of the nozzle side member (10); the notch (26B) of the disk-like member (26D) has a flat portion (26C); an end of the rod-shaped member (22) contacts with the flat portion (26C) and is supported (mounted) thereon when the nozzle side member (10) and the filling apparatus side member (20) are connected with each other.

Further, in the present invention, it is preferable that the support member (27) includes a rod mounting member (27D) with a protrusion (27A), a flat portion (27B) and an inclined portion (27C: tapered portion); and a deformation member (27F) with an inclined portion (27E) having a shape complementary to the inclined portion (27C) of the rod mounting member (27D) and attached to the filling apparatus side member (20), wherein an opening (3D: groove) into which the protrusion (27A) of the rod mounting member (27D) is inserted is formed on the protruding portion (3) of the nozzle side member (10); when the nozzle side member (10) and the filling apparatus side member (20) are connected with each other, an end portion of the rod-shaped member (22) contacts with the flat portion (27B) of the rod mounting member (27D) and is supported (mounted) thereon; an opening (21C: through hole) into which the protruding portion (3) of the nozzle side member (10) is inserted extends in the filling apparatus side member (20) in a direction orthogonal to the flow path (21A: in-socket flow path) of the filling apparatus side member (20), and a large diameter portion (21H) is formed in a region on the nozzle side of the flow path (21A) of the filling apparatus side member (20) in the opening (21C); and the protrusion (27A) is configured to come off from the opening (3D) when the inclined portion (27C) of the rod mounting member (27D) comes into contact with the inclined portion (27E) of the deformation member (27F).

Still further, in the present invention, it is preferable that the support member (28) has an annular portion (28A) and a ball holding portion (28B) that hold the ball (29) in between; when the nozzle side member (10) and the filling apparatus side member (20) are connected with each other, an end portion of the rod-shaped member (22) contacts with the annular portion (28A) and is supported (mounted) thereon; a recess (3E: groove) in which a part of the ball (29) is held by the ball holding portion (28B) is inserted is formed in the protruding portion (3) of the nozzle side member (10); in the filling apparatus side member (20), an opening (21C: through hole) into which the protruding portion (3) of the nozzle side member (10) is inserted extends in the filling apparatus side member (20) in a direction orthogonal to the flow path (21A) of the filling apparatus side member (20), and a large diameter portion (21I) is formed in a region on the nozzle side of the flow path (21A) of the filling apparatus side member (20) in the opening (21C); and when the nozzle side member (10) is disconnected from the filling apparatus side member (20) and the ball (29) reaches the large diameter portion (21I), the ball (29) disengages from a recess (3E) and moves into the large diameter portion (21I).

According to the safety joint (100, 100-1, 100-2) of the present invention with the above-mentioned configuration, the support member (26, 27, 28: rod support member) supporting (mounting) the rod-shaped member (22: rod) connected to the valve body (25) on the filling apparatus side, in conjunction with the nozzle side member (10), when the nozzle side member (10) is disengaged from the filling apparatus side member (20), at the initial stage, moves to a state in which the support member (26, 27, 28: rod support member) does not support (place) the rod-shaped member (22). When the rod-shaped member (22) is no longer supported by the support member (26, 27, 28), the rod-shaped member (22) is in a state of not blocking the movement of the valve body (25), and thereby the elastic member (23) on the filling apparatus side presses the valve body (25) on the filling apparatus side and the valve body (25) sits on the valve seat (21E: socket side valve seat). With this, at the initial stage when the nozzle side member (10) is disconnected from the filling apparatus side member (20), the shutoff valve (24) on the filling apparatus side shuts off, and the generation of outgas is suppressed.

For example, when the support member (26) includes a disk-like member (26D) with a protrusion (26A) and a notch (26B), the disk-like member (26D) rotatably supported; an opening (3: groove) into which the protrusion (26A) of the disk-like member (26D) is inserted is formed on a protruding portion (3) of the nozzle side member (10); an end of the rod-shaped member (22) contacts with the flat portion (26C) and is supported (mounted) thereon when the nozzle side member (10) and the filling apparatus side member (20) are connected with each other, the movement of the nozzle side member (10) to disengage from the filling apparatus side member (20) is converted into the rotation of the disk-shaped member (26D) via the opening (3C) of the nozzle side member (10) and the protrusion (26A) of the disc-shaped member (26D), when the disk-shaped member (26D) rotates, the rod-shaped member (22) is not supported (mounted) on the flat portion (26C) of the disk-shaped member (26D).

In addition, when the support member (27) has a rod mounting member (27D) with a protrusion (27A), a flat portion (27B) and an inclined portion (27C: tapered portion), and an opening (3D: groove) into which a protrusion (27A) of the rod mounting member (27D) is inserted is formed in the protruding portion (3) of the nozzle side member (10), and when the nozzle side member (10) and the filling apparatus side member (20) are connected, an end of the rod-shaped member (22) is in contact with the flat portion (27B) of the rod mounting member (27D) and is supported (mounted) thereon, the movement of the nozzle side member (10) away from the filling apparatus side member (20) is converted into the movement of the rod mounting member (27D) via the opening (3D) of the nozzle side member (10) and the protrusion (27A) of the rod mounting member (27D), and when the rod mounting member (27D) moves, the end portion of the rod-shaped member (22) is not supported (mounted) on the flat portion (27B) of the rod mounting member (27D). Further, a deformation member (27F) with an inclined portion (27E) having a shape complementary to the inclined portion (27C) of the rod mounting member (27D) and attached to the filling apparatus side member (20) is mounted, and when the inclined portion (27C) of the rod mounting member (27D) comes into contact with the inclined portion (27E) of the deforming member (27F), the protrusion (27A) is configured to come off from the opening (3D), thereby when the nozzle side member (10) is disconnected from the filling apparatus side member (20), the inclined portion (27C) of the rod mounting member (27D) comes into contact with the inclined portion (27E) of the deformation member (27F), the rod mounting member (27D) rides on the inclined portion (27E) of the deformation member (27F), and the rod mounting member (27D) rotates around an edge of the opening (3D) of the nozzle side member (10) and is accommodated in the large diameter portion (21H). As a result, the nozzle side member (10) is smoothly disengaged from the filling machine side member (20) without the rod mounting member (27D) being in a so-called "bitten" state with other members.

Still further, in the present invention, when the support member (28) has an annular portion (28A) and a ball holding portion (28B) that hold the ball (29) in between; when the nozzle side member (10) and the filling apparatus side member (20) are connected with each other, an end portion of the rod-shaped member (22) contacts with the annular portion (28A) and is supported (mounted) thereon; and a recess (3E: groove) in which a part of the ball (29) held by the ball holding portion (28B) is inserted is formed in the protruding portion (3) of the nozzle side member (10); in the filling apparatus side member (20), an opening (21C: through hole) into which the protruding portion (3) of the nozzle side member (10) is inserted extends in the filling apparatus side member (20) in a direction orthogonal to the flow path (21A: in-socket flow path) of the filling apparatus side member (20), and a large diameter portion (21I) is formed in a region on the nozzle side of the flow path (21A) of the filling apparatus side member (20) in the opening (21C), the movement that the nozzle side member (10) is disconnected from the filling apparatus side member (20) is converted into the movement of the ball holding portion (28B) via the recess (3E: groove) and the ball (29) of the nozzle side member (10), when the ball holding portion (28B) moves, the end portion of the rod-shaped member (22) is not supported (mounted) on the annular portion (28A). Then, when the nozzle side member (10) is disconnected from the filling apparatus side member (20) and the ball (29) reaches the large diameter portion (21I), the ball (29) is disconnected from the recess (3E) and moves into the large diameter portion (21I), so that the ball holding portion (28B) and the protruding portion (3) of the nozzle side member (10) are separated, thereby the ball holding portion (28B) and the ball (29) do not hinder the movement that the nozzle side member (10) is separated from the filling apparatus side member (20).

DETAILED DESCRIPTION

Figure 1:
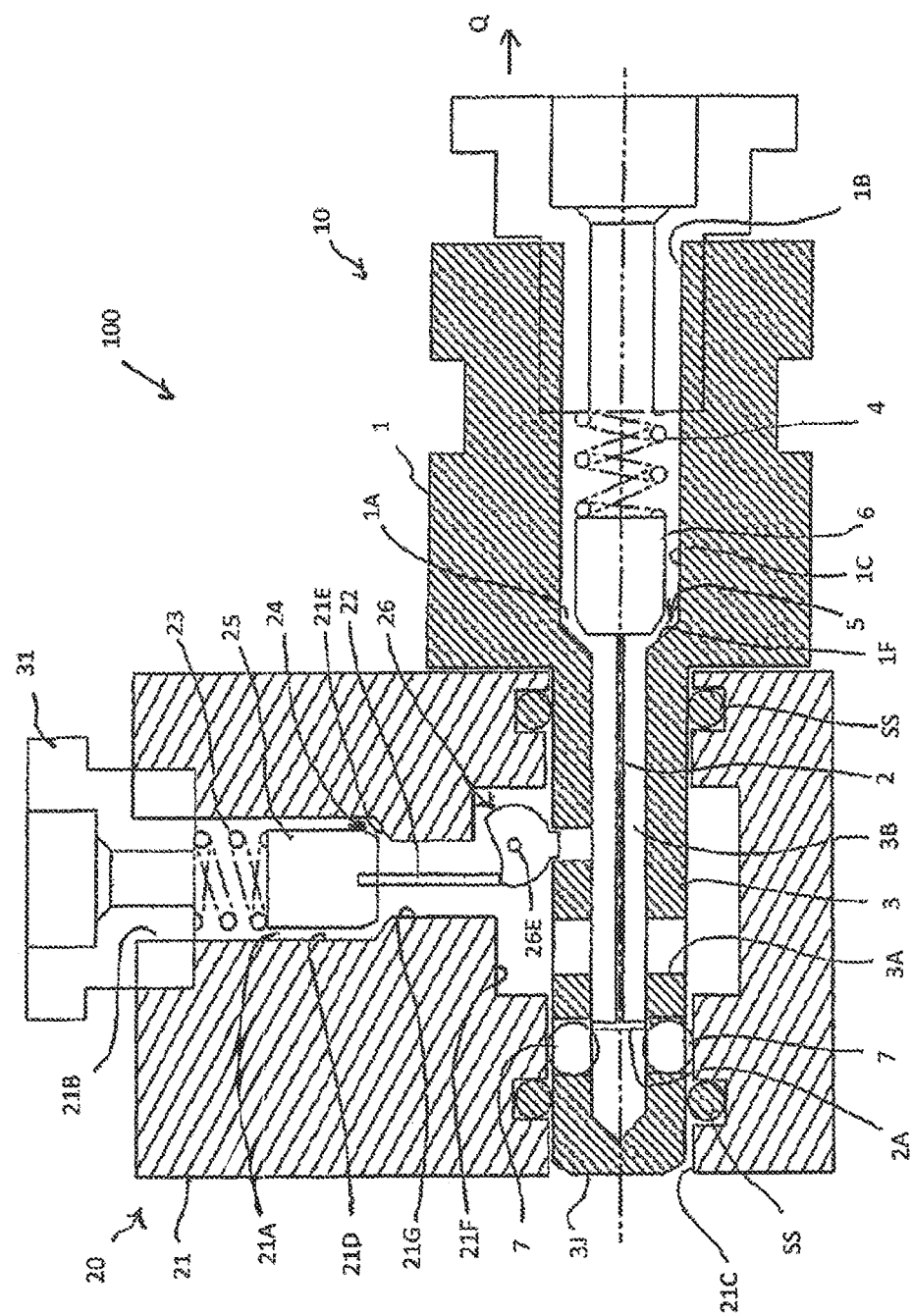
FIG. 1 is an explanatory cross-sectional view of a safety joint according to the first embodiment of the present invention in a state where a plug is connected to a socket.

Hereinafter, embodiments of the present invention will be explained with reference to the attached drawings. In the illustrated embodiments, the same members as those of the prior art (Patent Document 1) are designated by the same reference numerals. In the illustrated embodiments, the safety joint entirely represented by the reference numeral 100 has a socket 20 which is a filling apparatus side member and a plug 10 which is a nozzle side member. First, the first embodiment will be described with reference to FIGS. 1, 2 and 3. In FIG. 1 showing a state in which the plug 10 (nozzle side member) and the socket 20 (filling apparatus side member) are connected, the plug 10 with a cylindrical shape as a whole has a plug body 1 and a plug side protruding member 3 projecting to the socket 20 side (left side in FIG. 1). In the state shown in FIG. 1 in which the plug 10 and the socket 20 are connected, the plug side protruding member 3 is inserted into an opening 21C formed in a socket body 21. A hydrogen gas supply port 1B (hydrogen gas outlet) is provided at an end of the plug body 1 on the vehicle side (right side in FIG. 1: the side separated from the socket 20 side), and the hydrogen gas outlet 1B is connected to a filling hose 201 (see FIG. 14: not shown in FIG. 1).

An in-plug flow path 1A is formed in the central portion, in the vertical direction, of the plug body 1 and the plug side protruding member 3, and the in-plug flow path 1A extends in the axial direction of the plug 10 (longitudinal direction: left-right direction in FIG. 1). The plug side valve body accommodating portion 1C, which is an expanded area, is provided in the in-plug flow path 1A. The in-plug flow path 1A communicates from the flow path in the plug side protruding member 3 (internal space 3B of the plug side protruding member 3) with the hydrogen gas outlet 1B via the flow path in the plug side valve body accommodating portion 1C, in other words, the in-plug flow path 1A includes the internal space 3B of the plug side protruding member 3 and the flow path in the plug side valve body accommodating portion 1C. A hole 3A is formed in the plug side protruding member 3, and the hole 3A communicates the in-plug flow path 1A and the in-socket flow path 21A with each other. The plug side rod 2 is housed in the in-plug flow path 1A. A plug side valve body 6 is provided at the end of the plug side rod 2 on the side separated from the socket 20 (on the right side in FIG. 1), and the plug side valve body 6 is housed in the valve body accommodating portion 1C. In the valve body accommodating portion 1C, a plug side spring 4 (elastic material) is arranged on the side of the plug side valve body 6 separated from the socket 20 (on the right side in FIG. 1), and the plug side spring 4 urges the plug side valve body 6 to the socket 20 side (left side in FIG. 1). The plug side valve body 6 and a valve seat 1F form a plug side shutoff valve 5, and the valve seat 1F is composed of a tapered portion of the valve body accommodating portion 1C. The plug side shutoff valve 5 has a function of shutting off or opening the in-plug flow path 1A. As shown in FIG. 1, when the plug 10 and the socket 20 are connected, the plug side shutoff valve 5 is opened, and the in-plug flow path 1A communicates with the in-socket flow path 21A.

In FIG. 1, a groove for a locking ball 7 is formed near the tip of the plug side protruding member 3 on the socket 20 side (left side in FIG. 1) to hold the locking ball 7. An annular ball accommodating space 21F is formed on the socket 20 side (socket body 21), and the ball accommodating space 21F accommodates the locking ball 7 when the connection between the plug 10 and the socket 20 is released. The plug side rod 2 connected to the plug side valve body 6 extends to the socket 20 side (left side in FIG. 1), and a flat plate member 2A is provided at the tip on the socket 20 side. In the state where the plug 10 and the socket 20 are connected, the flat plate member 2A is in contact with the locking ball 7 (the portion of the plug side protruding member 3 protruding into the internal space 3B). In the state shown in FIG. 1, the locking ball 7 is not located in the annular ball accommodating space 21F, so that the flat plate member 2A cannot move to the side (socket 20 side: left side in FIG. 1) separated from the plug 10 beyond the locking ball 7, and the plug side rod 2 does not move from the position where it comes into contact with the locking ball 7 to the socket 20 side (left side in FIG. 1) against the elastic repulsive force of the plug side spring 4. As a result, in the state shown in FIG. 1 where the plug 10 and the socket 20 are connected, the plug side valve body 6 is held in a state of being separated from the plug valve seat 1F, and the shutoff valve 5 on the plug 10 side is held in the open state. A plug member 3J integrally configured with the plug side protruding member 3 is provided on the side of the opening 21C on the socket side separated from the plug 10 (on the left side in FIG. 1). In FIG. 1, reference symbol SS is a seal member (for example, an O-ring).

In FIG. 1, in the socket body 21 of the socket 20 with a cylindrical shape as a whole, at the end of the hydrogen filling apparatus (not shown) side (upper side in FIG. 1), a hydrogen gas introduction port 21B for introducing hydrogen gas supplied from the hydrogen filling machine is provided. The hydrogen gas introduction port 21B is provided with a plug member 31 having a flow path inside. The socket body 21 is formed with an in-socket flow path 21A extending in the vertical direction in FIG. 1. A socket side valve body accommodating portion 21D, which is an expanded area, is formed in the in-socket flow path 21A, and a socket side valve body 25 is accommodated in the socket side valve body accommodating portion 21D. In the in-socket flow path 21A, the region on the side (lower side of FIG. 1) of the socket side valve accommodating portion 21D separated from the hydrogen gas introduction port 21B constitutes a socket side rod accommodating portion 21G.

In FIG. 1, the socket 20 includes a socket side rod 22 (filling apparatus side rod-shaped member), a socket side valve body 25 integrally connected to the hydrogen filling apparatus side (upper in FIG. 1) of the socket side rod 22 and a socket side spring 23 arranged on the hydrogen gas introduction port 21B side (upper in FIG. 1) of the socket side valve body 25, and the socket side rod 22, the socket side valve body 25, and the socket side spring 23 are housed in the in-socket flow path 21A (internal space of the socket body 21). Here, the socket side spring 23 urges the socket side valve body 25 to be separated from the hydrogen gas introduction port 21B (lower side in FIG. 1). The socket side valve body 25 and the valve seat 21E constitute the socket side shutoff valve 24, and the valve seat 21E is composed of the tapered portion of the valve body accommodating portion 21D. The socket side shutoff valve 24 has a function of shutting off or opening the in-socket flow path 21A. As is clearly shown in FIG. 2, the socket side rod 22 is supported (mounted) by the support member 26 (rod support member).

Figure 2:
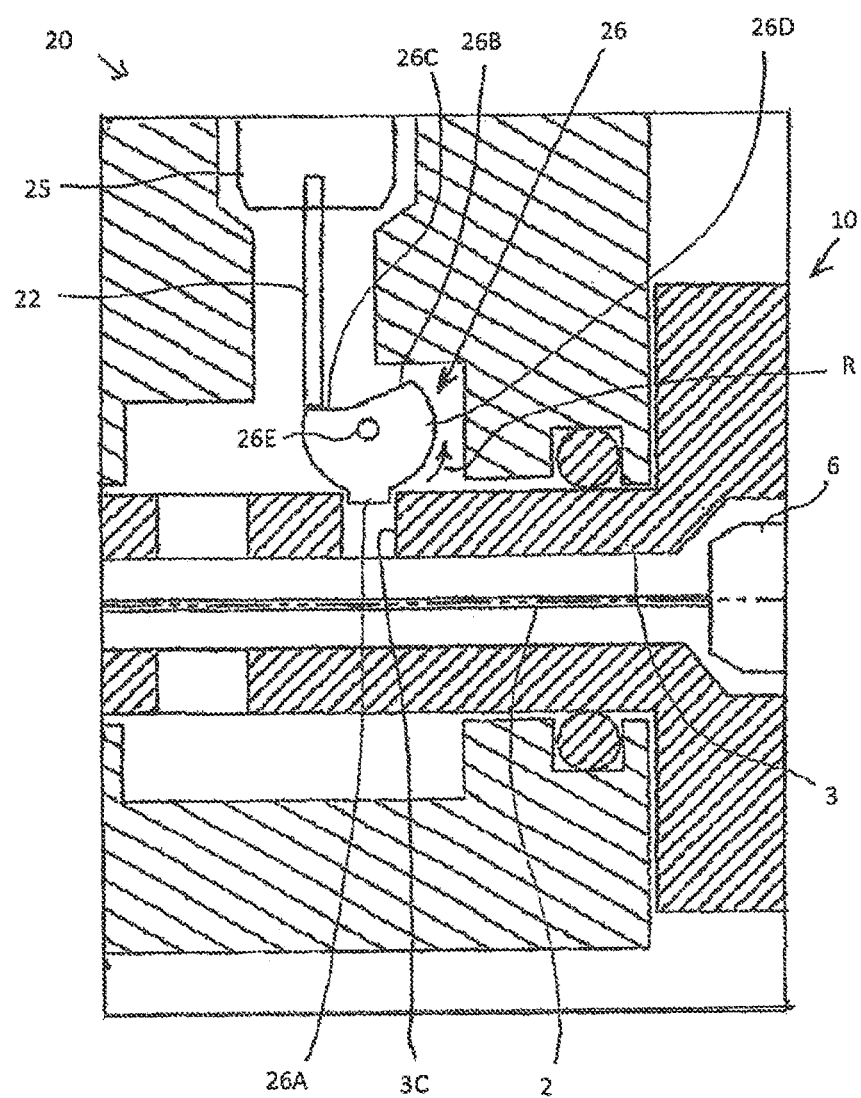
FIG. 2 is an explanatory enlarged view of a support member in the safety joint shown in FIG. 1.

In FIG. 2, the support member 26 has a disk-shaped member 26D (FIG. 2), and the disk-shaped member 26D is rotatably supported around a rotation center 26E on a socket body 21. The disk-shaped member 26D is provided with a protrusion 26A and a notch 26B, and the notch 26B has a flat portion 26C. The protrusion 26 is engaged with (inserted into) the opening 3C (groove) formed in the plug side protruding member 3. In the state where the plug 10 and the socket 20 are connected (the state of FIGS. 1 and 2), the notch 26B of the disc-shaped member 26D is located on the socket side valve body 25 side (upper side in FIGS. 1 and 2), and the end of the socket side rod 22 on the plug side protruding member 3 side (lower side in FIGS. 1 and 2) is in contact with the flat portion 26C and supported (placed) thereon. Since the protrusion 26A of the disc-shaped member 26D is engaged with the opening 3C, the disc-shaped member 26D does not rotate, and the socket side rod 22 is supported (mounted) on the flat portion 26C, so that the socket side rod 26 holds the socket side valve body at a position separated from the valve seat 21E as shown in FIGS. 1 and 2 against the elastic repulsive force of the socket side spring 23 and the socket side shutoff valve 24 is maintained in an open state.

Figure 14:
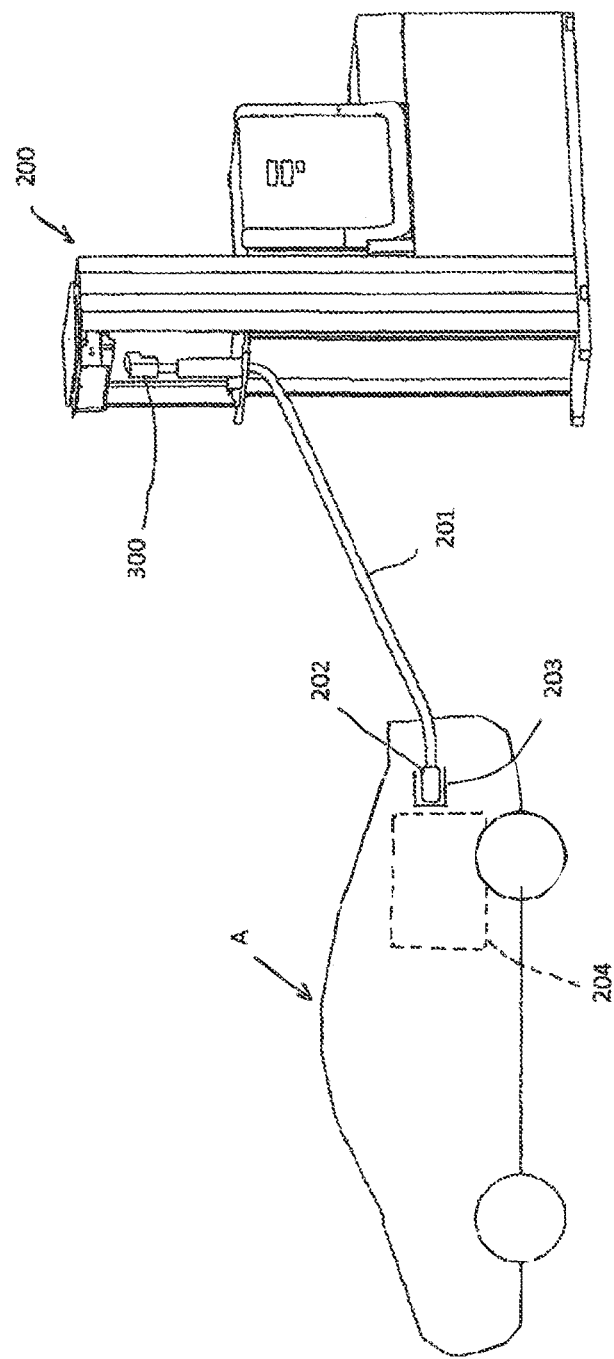
FIG. 14 is an explanatory view showing an outline of a hydrogen filling facility.
Figure 15:
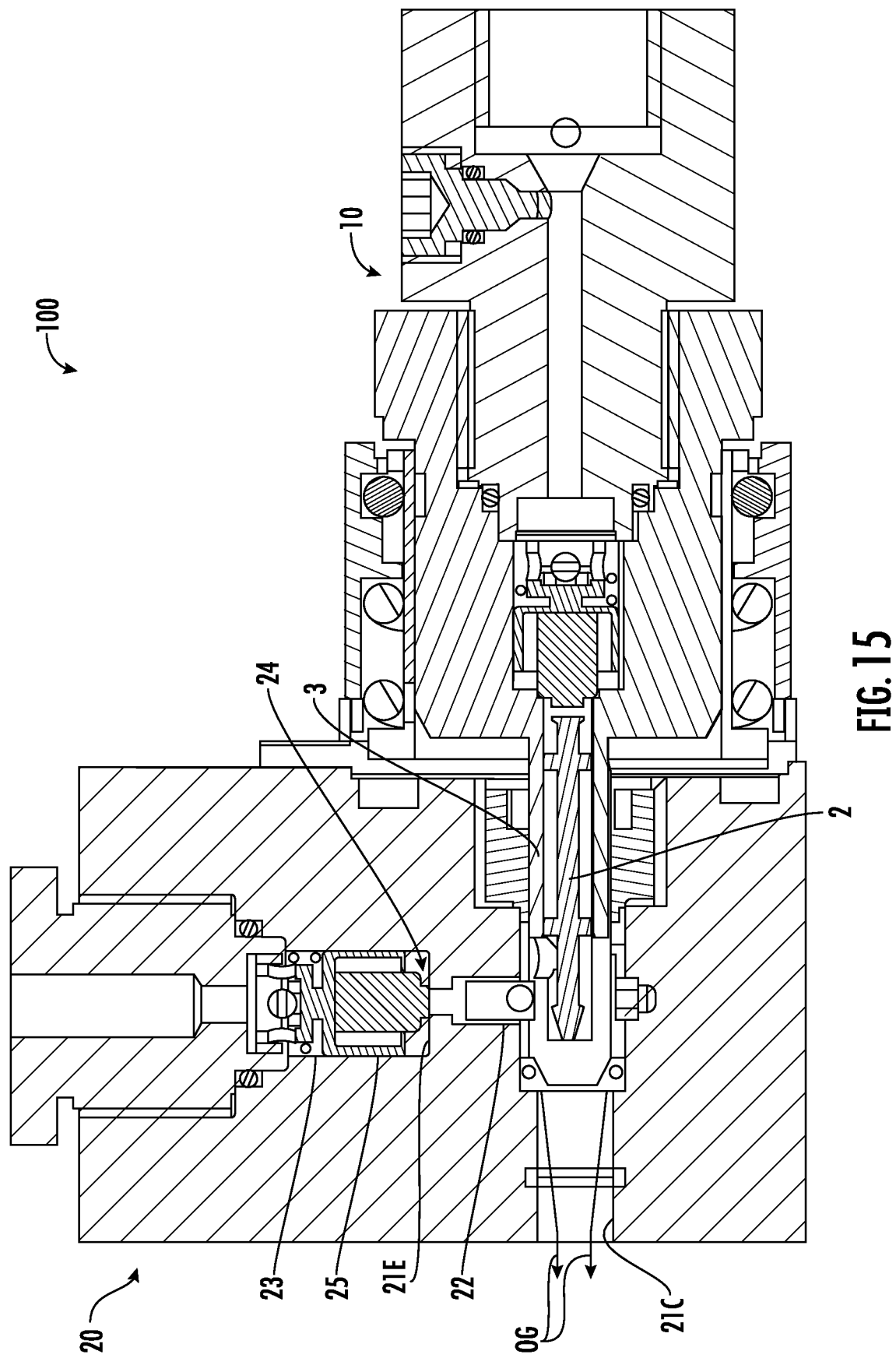
FIG. 15 is a cross-sectional view showing an initial stage of the process that a plug is pulled out from a socket in a prior art.

As shown in FIG. 1, when the plug 10 and the socket 20 are connected, the socket side shutoff valve 24 is open. At that time, the in-socket flow path 21A communicates the hydrogen gas introduction port 21B with the opening portion 21C (through hole) of the socket body 21 via the socket side valve body accommodating portion 21D, the socket side rod accommodating portion 21G, and the annular ball accommodating space 21F. The in-socket flow path 21A communicates with the in-plug flow path 1A via a hole 3A formed in the plug side protruding member 3. The hydrogen gas that has flowed into the safety joint 100 from the hydrogen gas introduction port 21B flows to the hydrogen gas supply port 1B through the communication passages, and flows through the filling hose 201 (FIG. 14).

In FIG. 1, for example, when a fuel cell vehicle (FCV) not shown during hydrogen filling suddenly starts and a large tension acts on the filling hose, as shown by the arrow Q, a force that causes the plug 10 to come out of the socket 20 acts. When the tension is equal to or higher than a predetermined value, the plug 10 moves in the direction of the arrow Q, and the connection between the plug 10 and the socket 20 is disconnected. However, the first embodiment shown in FIGS. 1 to 3 has a function of immediately shutting off the socket side shutoff valve 24 in such a case. The support member 26 in the socket 20 changes to a state in which the socket side rod 22 is not supported (placed) when the plug 10 is disengaged from the socket 20.

Figure 3:
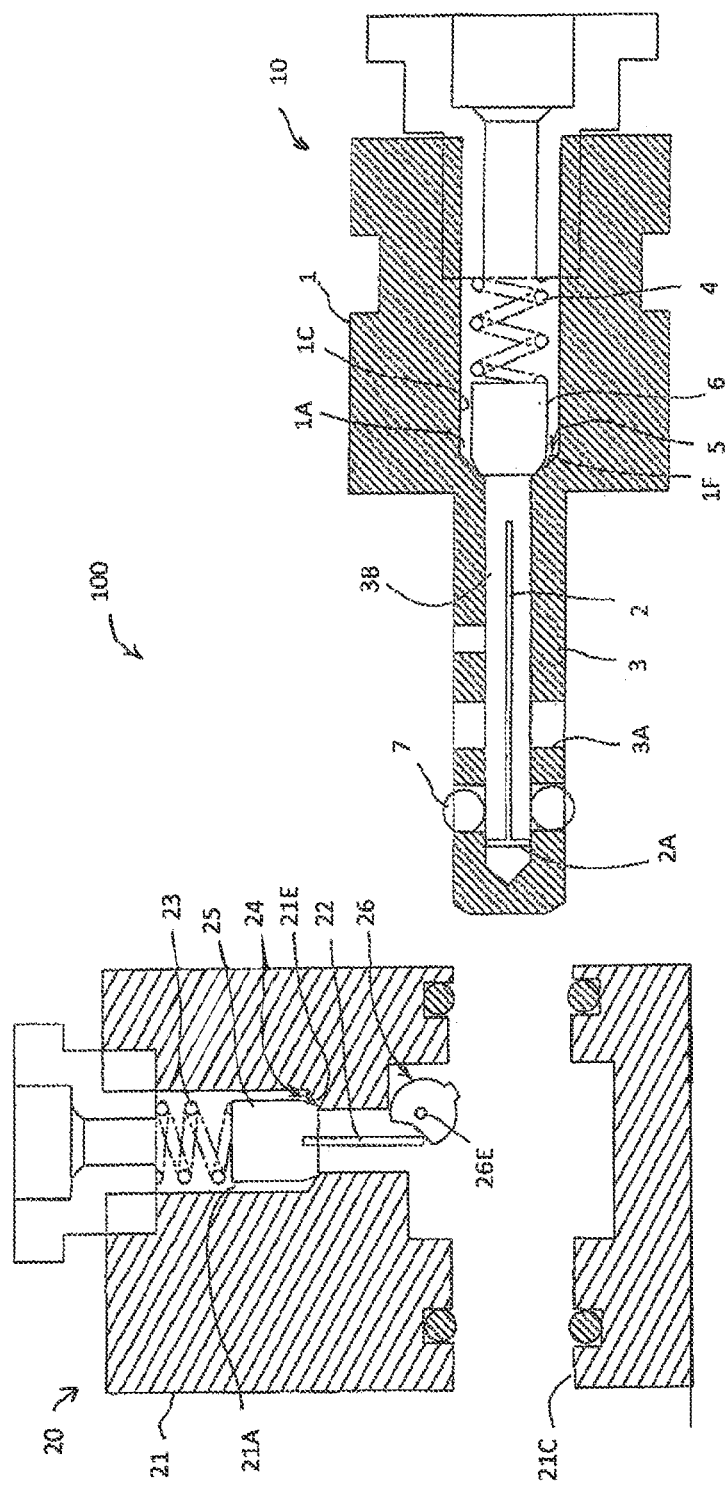
FIG. 3 is an explanatory cross-sectional view of a state in which the plug is disconnected from the socket in the safety joint shown in FIG. 1.

As described above, since the protrusion 26A of the disc-shaped member 26D is engaged with the groove 3C of the plug side protruding member 3, when the plug 10 moves in the arrow Q direction with respect to the socket 20, the disc-shaped member 26D rotates in the direction of the arrow R (FIG. 2). When the disk-shaped member 26D rotates in the direction of the arrow R, the flat portion 26C of the notch 26B of the disk-shaped member 26D moves from the horizontal position on the socket side valve body 25 side (upper side in FIGS. 1 and 2) to a non-horizontal position as shown in FIG. 3 (position shown in FIG. 3: the flat portion 26C is the position on the left side of the disk-shaped member 26D), so that the socket side rod 22 is no longer placed (supported) on the flat portion 26C. The socket side rod 22 that is no longer placed (supported) on the flat portion 26C of the disk-shaped member 26D cannot resist the elastic repulsive force of the socket side spring 23 and moves (falls) to the plug side protruding member 3 (lower side in FIGS. 1 to 3). When the socket side rod 22 falls, the socket side valve body 25 is pressed by the elastic repulsive force of the socket side spring 23 and instantly sits on the valve seat 21E, and the socket side shutoff valve 24 is closed. That is, when the plug 10 moves in the direction of the arrow Q and the disk-shaped member 26D rotates in the direction of the arrow R, the socket side rod 22 supported by the flat portion 26C of the notch 26B of the disk-shaped member 26D of the support member 26 instantly moves (downs) to the plug side protruding member 3 side, so that as shown in FIG. 3, the socket side shutoff valve 24 is instantly closed at the initial stage when the plug 10 is disconnected from the socket 20. Closing the socket side shutoff valve 24 prevents hydrogen gas flowing into the in-socket flow path 21A from the gas introduction port 21B from flowing out to the outside of the socket 20.

As described above, in the state of FIG. 1 (the state in which the plug 10 and the socket 20 are connected), the flat plate-shaped end 2A of the plug side rod 2 is in contact with the locking ball 7, so that it is not possible to move from the state shown in FIG. 1 in the extension direction of the plug side spring 4 (to the left in FIG. 1). In FIG. 1, when the plug 10 starts to come out of the socket 20, the plug 10 moves in the direction of the arrow Q, and the locking ball 7 also moves in the direction of the arrow Q (to the right in FIG. 1) to reach the position of the annular ball accommodating space 21F. When the locking ball 7 reaches the position of the annular ball accommodating space 21F, the locking ball 7, which is pressed by the elastic repulsive force of the plug side spring 4, moves outward in the radial direction (vertical direction in FIG. 1) to enter the annular ball accommodating space 21F ball storage space 21F. When the locking ball 7 enters the annular ball accommodating space 21F, the locking ball 7 does not project into the internal space 3B of the plug side protruding member 3, so that the locking ball 7 does not prevent the end portion 2A of the plug side rod 2 from moving in the extension direction (leftward direction in FIG. 1) of the plug side spring 4. As a result, as shown in FIG. 3, the plug side valve body 6 moves in the extension direction (leftward in FIGS. 1 and 3) due to the elastic repulsive force of the plug side spring 4, and sits on the valve seat 1F, thereby the plug side shutoff valve 5 is closed, and high-pressure hydrogen gas existing in the in-plug flow path 1A is prevented from flowing out to the outside of the plug 10. That is, as shown in FIG. 3, when the connection between the plug 10 and the socket 20 is released in the safety joint 100 according to the first embodiment, the plug side shutoff valve 5 and the socket side shutoff valve 24 are instantly closed, and hydrogen gas is prevented from flowing out to the outside of the plug 10 or the outside of the socket 20.

Next, the second embodiment of the present invention will be described with reference to FIGS. 4 to 7. In the explanation of the second embodiment shown in FIGS. 4 to 7, parts which are different from those of the first embodiment shown in FIGS. 1 to 3 will be mainly described. In the second embodiment, although the mechanism that immediately shuts off the socket side shutoff valve 24 when the connection between the plug 10 and the socket 20 is disconnected includes a support member 27 (rod support member) that supports (places) the socket side rod 22, the support member 27 is different from the support member 26 of the first embodiment shown in FIGS. 1 to 3. The support member 27 in the second embodiment shown in FIGS. 4 to 7 moves together with the plug 10 when the plug 10 is disengaged from the socket 20, and changes to a state in which the socket side rod 22 is not supported (not mounted).

Figure 4:
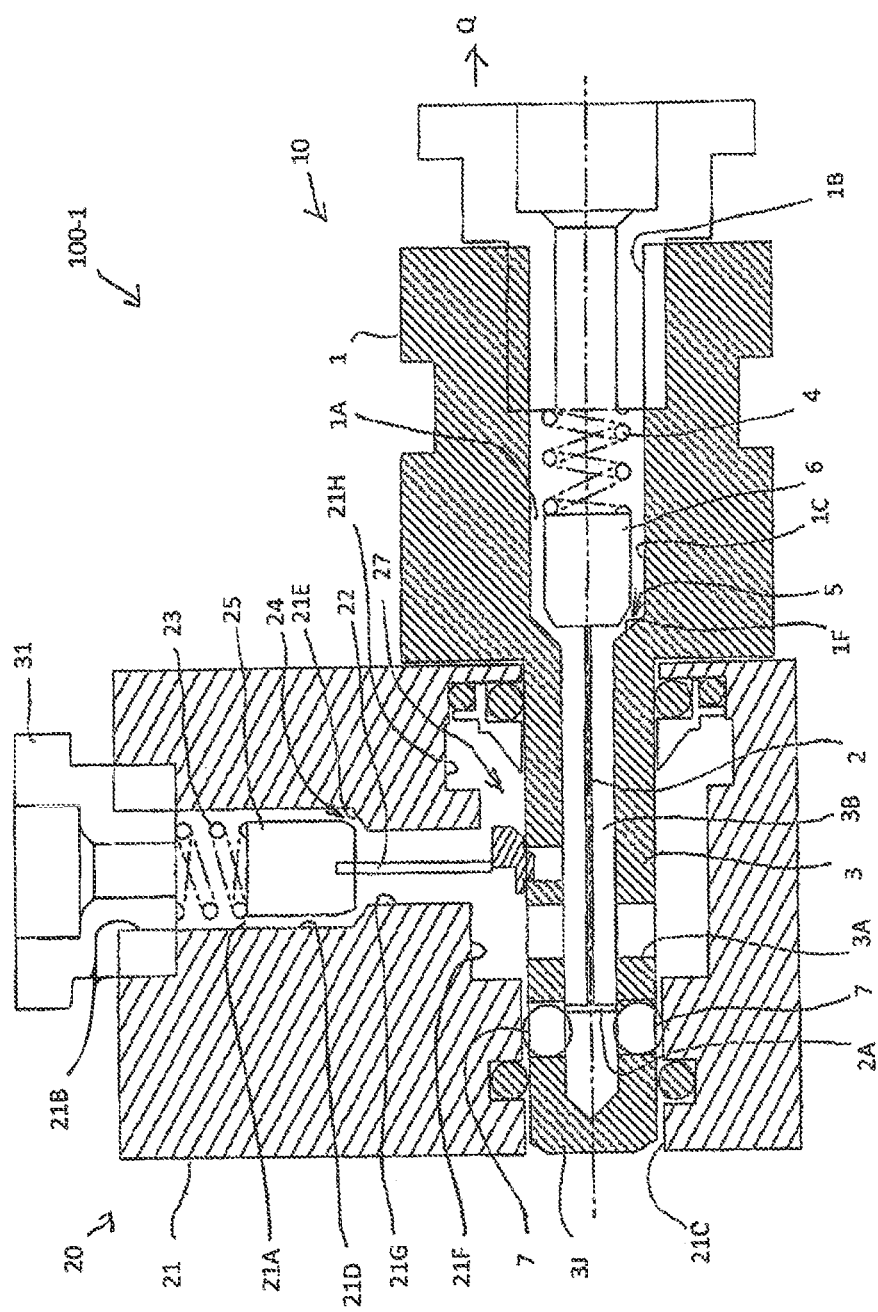
FIG. 4 is an explanatory cross-sectional view of a safety joint according to the second embodiment of the present invention in a state where a plug is connected to a socket.
Figure 5:
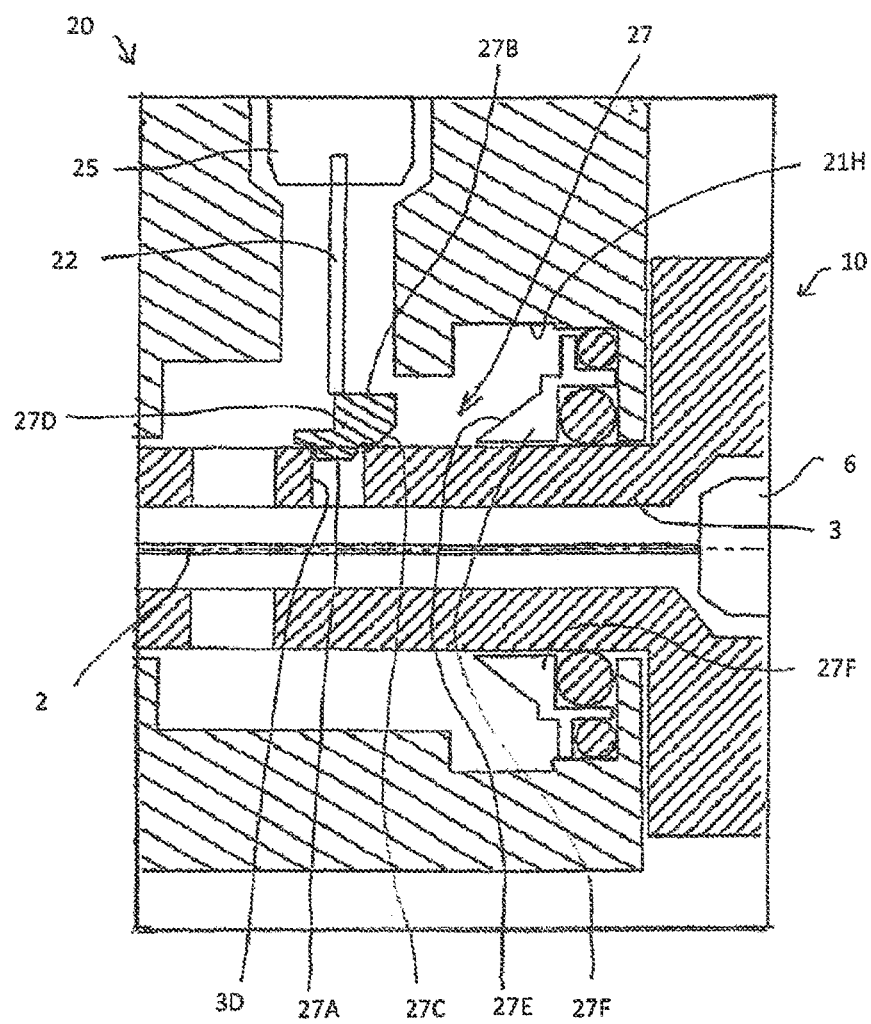
FIG. 5 is an explanatory enlarged view of a support member in the safety joint shown in FIG. 4.

As shown in FIG. 5, the support member 27 has a rod mounting member 27D and a deformation member 27F, and the rod mounting member 27D has a protrusion 27A, a flat portion 27B, and an inclined portion 27E having a shape complementary to the inclined portion 27C of the rod mounting member 27D. In FIG. 5, the deformation member 27F is located on the plug body 1 side (right side in FIG. 5) with respect to the rod mounting member 27D, and is attached to the socket body 21 (FIG. 4). Further, the plug side protruding member 3 is formed with an opening 3D (groove) with which the protrusion 27A of the rod mounting member 27D is engaged. Further, an opening 21C (through hole) is formed in the socket 20, a plug side protruding member 3 is inserted into the opening 21C, and the opening 21C is formed so as to extend in a direction orthogonal to the in-socket flow path 21A. In the opening 21C, a large diameter portion 21H is formed in a region on the plug 10 side (right side in FIGS. 4 and 5) with respect to the in-socket flow path 21A. In the state where the plug 10 and the socket 20 are connected (the states shown in FIGS. 4 and 5), the flat portion 27B of the rod mounting member 27D is located directly below the socket side rod 22 in FIGS. 4 and 5, so that the end of the socket side rod 22 on the plug side protruding member 3 side (lower side in FIGS. 4 and 5) is supported (mounted) on the flat portion 27B in a horizontal state. Since the protrusion 27A of the rod mounting member 27D is engaged with the opening 3D, the rod mounting member 27D does not move to the plug 10 side (right side in FIGS. 4 and 5) in the states of FIGS. 4 and 5, and the state in which the socket side rod 22 is supported (mounted) on the flat portion 27B is maintained, so that the socket side rod 22 keeps the socket side valve body 25 separated from the valve seat 21E against the elastic repulsive force of the socket side spring 23, and the socket side shutoff valve 24 is open.

In the state shown in FIG. 4, the hydrogen gas flowing in from the hydrogen gas introduction port 21B flows into the opening portion 21C (through hole) of the socket body 21 via the socket side valve accommodating portion 21D of the hydrogen gas introduction port 21B, the open socket side shutoff valve 24, the socket side rod accommodating portion 21G, and the annular ball accommodating space 21F, the hydrogen gas flows through the in-plug flow path 1A through the hole 3A formed in the plug side protruding member 3, and flows from the hydrogen gas outlet 1B into the filling hose 201 (FIG. 14). Here, similarly to the first embodiment shown in FIGS. 1 to 3, when the plug 10 and the socket 20 are connected, the plug side shutoff valve 5 is open, and the in-plug flow path 1A communicates the hydrogen gas outlet 1B with the flow path in the plug side protruding member 3 (internal space 3B of the plug side protruding member 3) via the flow path in the plug side valve body accommodating portion 1C.

In FIGS. 4 and 5, the protrusion 27A on the lower side of the rod mounting member 27D of the support member 27 (rod support member) is engaged with the groove 3D (opening) of the plug side protrusion member 3. With this, when the connection between the plug 10 and the socket 20 is disconnected and the plug 10 moves in the direction of the arrow Q (to the right in FIGS. 4 and 5), together with the plug 10, the protrusion 27A and the rod mounting member 27D also move in the direction of the arrow Q (on the right side in FIG. 4). When the rod mounting member 27D moves in the direction of the arrow Q (on the right side in FIG. 4) and the flat portion 27B of the rod mounting member 27D no longer exists at a position directly below the socket side rod 22, the socket side rod 22 moves (descents) to the plug side protruding member 3 side (lower side in FIG. 4 and FIG. 5) by the elastic repulsive force of the socket side spring 23. When the socket side rod 22 descends, the socket side valve body 25 is pressed by the elastic repulsive force of the socket side spring 23 and instantly sits on the valve seat 21E, and the socket side shutoff valve 24 is instantly closed. In this way, when the rod mounting member 27D moves in the direction of the arrow Q (to the right in FIG. 4), the socket side rod 22 supported by the flat portion 27B of the rod mounting member 27D of the support member 26 immediately moves (descends) to the plug side protruding member 3 side (lower side in FIGS. 4 and 5), so that the socket side shutoff valve 24 is instantly closed at the initial stage when the plug 10 is disengaged from the socket 20. The hydrogen gas that has flowed into the in-socket flow path 21A from the gas introduction port 21B is blocked by the socket side shutoff valve 24 so that the hydrogen gas does not flow out to the outside of the socket 20. Such a state is shown in FIGS. 6 and 7.

Figure 6:
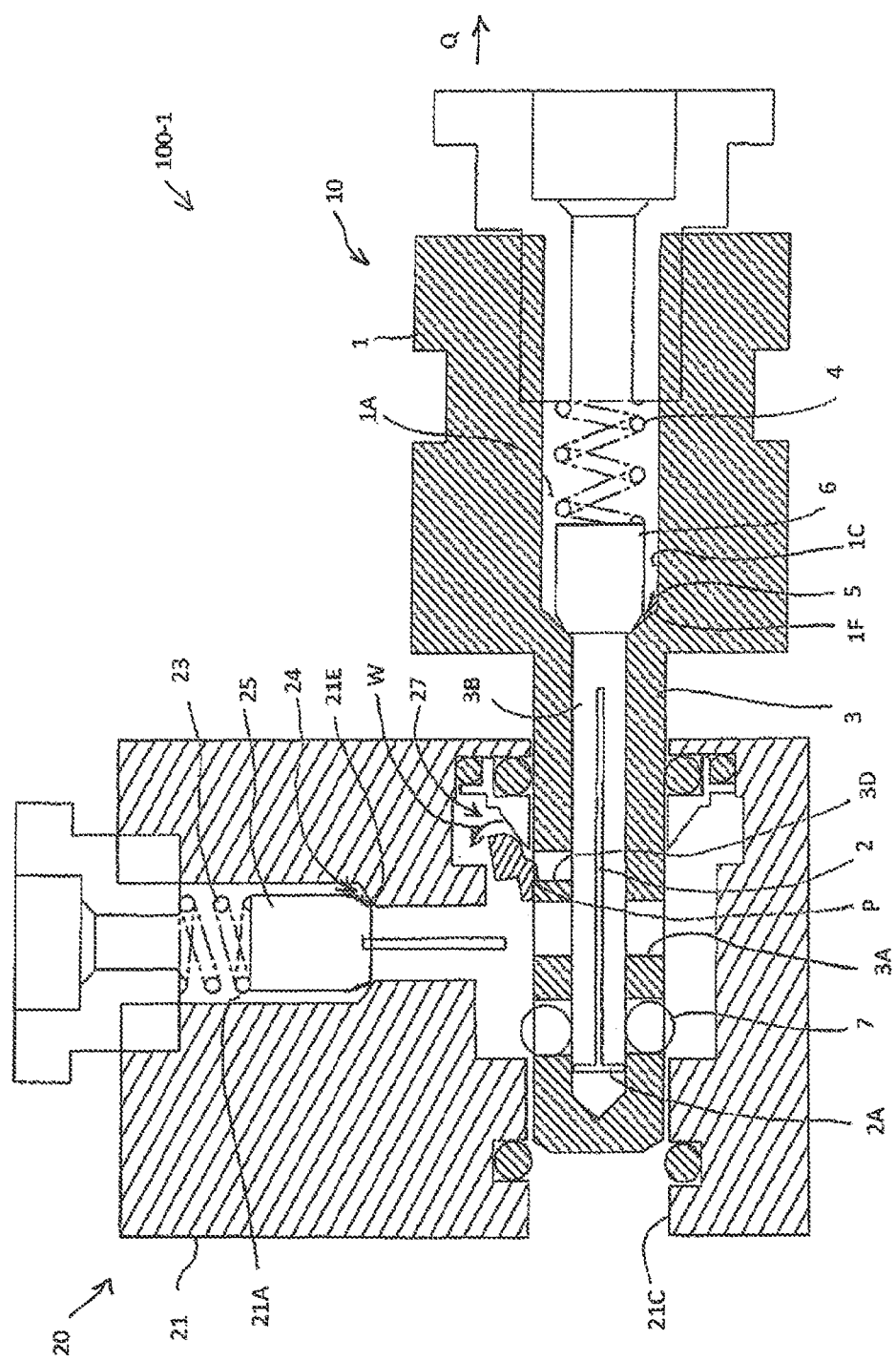
FIG. 6 is an explanatory cross-sectional view showing an initial state in which the plug is disconnected from the socket in the safety joint shown in FIG. 4.
Figure 7:
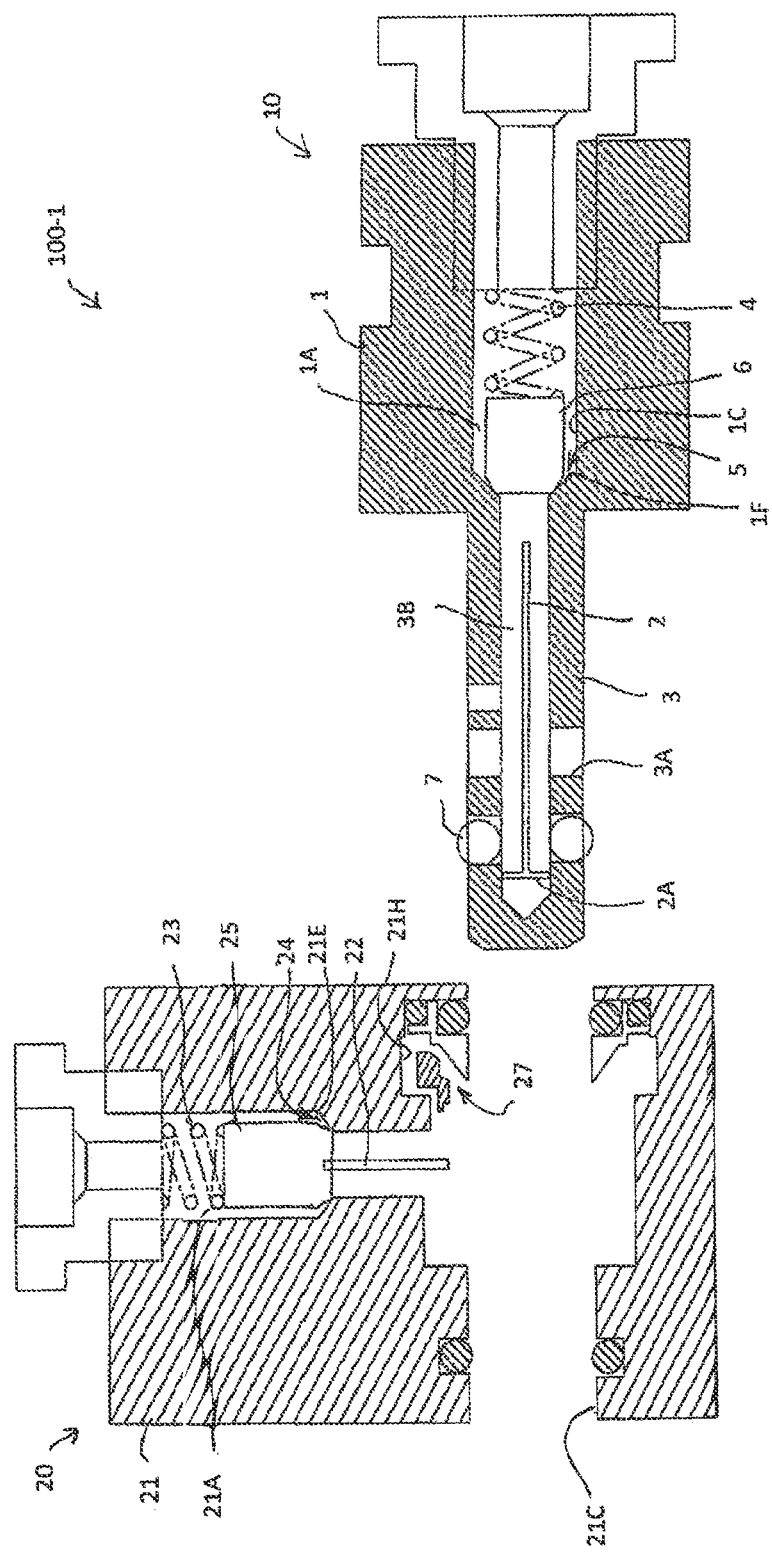
FIG. 7 is an explanatory cross-sectional view of a state in which the plug is disconnected from the socket in the safety joint shown in FIG. 4.

In FIG. 6, which shows the initial state in which the plug 10 is disengaged from the socket 20, when the plug 10 further moves in the direction of the arrow Q, if the rod mounting member 27D does not rotate toward the arrow W in FIG. 6 and does not move in the direction of being accommodated in the large diameter portion 21H (FIGS. 4 and 5), the rod mounting member 27D keeps the state of being fitted in the groove 3D (opening) of the plug side protruding member 3, and when the plug 10 further moves to the side where the plug 10 comes off with respect to the socket 20 (right side in FIGS. 4 to 7), the rod mounting member 27D interferes with other members, and it becomes a so-called "bitten" state (locked state), and there is a risk that the plug 10 will not come off the socket 20. According to the second embodiment shown in FIGS. 4 to 7, when the plug 10 moves in the direction of the arrow Q, as shown in FIG. 6, the inclined portion 27C (tapered portion) of the rod mounting member 27D comes into contact with the inclined portion 27E (tapered portion, FIG. 5) of the deformation member 27F (FIG. 5), as the plug 10 moves in the direction of the arrow Q, the inclined portion 27C is guided by the tapered portion 27E, and the rod mounting member 27D moves to the plug 10 side (right side in FIG. 6). Guiding the inclined portion 27C by the tapered portion 27E allows the rod mounting member 27D (FIG. 5) to ride on the tapered portion 27E (FIG. 5) of the deformation member 27F (FIG. 5). When the rod mounting member 27D rides on the tapered portion 27E of the deformation member 27F, the rod mounting member 27D rotates in the arrow W direction (FIG. 6) about the edge P (FIG. 6) of the groove 3D of the plug side protruding member 3. Rotating in the direction of the arrow W, the rod mounting member 27D moves so as to be accommodated in the large diameter portion 21H. Since when rotating in the direction of the arrow W, the protrusion 27A of the rod mounting member 27D comes off from the groove 3D (opening), even if the plug 10 moves in the direction of the arrow Q, the rod mounting member 27D does not move in the direction of the arrow Q, so that the rod mounting member 27D does not interfere with other members to form a so-called "bitten" state. Then, the plug 10 is smoothly disengaged (comes out) from the socket 20 (on the right side in FIGS. 4 to 7).

In the second embodiment shown in FIGS. 4 to 7, the opening and closing of the plug side shutoff valve 5 by the plug side valve body 6 is the same as that of the first embodiment shown in FIGS. 1 to 3. In the state of FIG. 4 in which the plug 10 and the socket 20 are connected, since the flat plate-shaped end 2A of the plug side rod 2 is in contact with the locking ball 7, the rod end 2A does not move to the side (left side in FIG. 4) separated from the plug body 1 from the locking ball 7, and since the plug side valve body 6 is held in a state of being separated from the plug valve seat 1F, the plug side shutoff valve 5 is in an open state. On the other hand, when the plug 10 starts to come out of the socket 20 and the plug 10 moves in the direction of the arrow Q, the locking ball 7 also moves in the direction of the arrow Q (right), when reaching the ball accommodating space 21F, the locking ball 7 enters the ball accommodating space 21F and does not protrude into the internal space 3B of the plug side protruding member 3. As a result, the locking ball 7 does not prevent the end 2A of the plug side rod 2 from moving to the side separated from the plug body 1 (left side in FIG. 4), and the plug side valve body 6 moves in the extension direction of the plug side spring 4 (to the left in FIG. 4). Then, the plug side valve body 6 is instantly seated on the plug valve seat 1F by the elastic repulsive force of the plug side spring 4, and the plug side shutoff valve 5 is closed.

Closing the plug side shutoff valve 5 prevents hydrogen gas from flowing out from the plug 10. The states in which the socket side shutoff valve 24 and the plug side shutoff valve 5 are closed are shown in FIGS. 6 and 7. In FIG. 7, which shows a state in which the plug 10 is completely disconnected from the socket 20, the rod mounting member 27D and the deformation member 27F are housed in the large diameter portion 21H formed in the socket body 21.

According to the safety joint 100-1 shown in FIGS. 4 to 7, since the support member 27 has the rod mounting member 27D and the deformation member 27F and when the plug 10 and the socket 20 are connected, the end portion of the socket side rod 22 contacts with the flat portion 27B of the rod mounting member 27D and is supported (mounted) thereon, the socket side valve body 25 is held in an open state against the elastic repulsive force of the socket side spring 23. In the safety joint 100-1, the movement of the plug 10 to be disengaged from the socket 20 is transmitted to the rod mounting member 27D via the groove 3D of the plug side protruding member 3 and the protrusion 27A of the rod mounting member 27D, if the rod mounting member 27D moves together with the plug 10, the end portion of the socket side rod 22 is not supported (mounted) on the flat portion 27B of the rod mounting member 27D, and the socket side valve body 25 instantly sits on the valve seat due to the elastic repulsive force of the socket side spring 23. Here, when the plug 10 comes off from the socket 20, the inclined portion 27C of the rod mounting member 27D comes into contact with the inclined portion 27E of the deformation member 27F, the rod mounting member 27D rides on the inclined portion 27E of the deformation member 27F, and the rod mounting member 27D rotates around the edge P in the groove 3D of the plug side protruding member 3 in the direction of the arrow W in FIG. 6, and is housed in the large diameter portion 21H. Accommodating the rod mounting member 27D in the large diameter portion 21H prevents that the rod mounting member 27D interferes with other members and becomes a so-called "bitten" state, and the plug 10 smoothly comes off from the socket 20. Other configurations and operational effects of the safety joint 100-1 of the second embodiment are the same as those of the safety joint 100 of the first embodiment shown in FIGS. 1 to 3.

Figure 8:
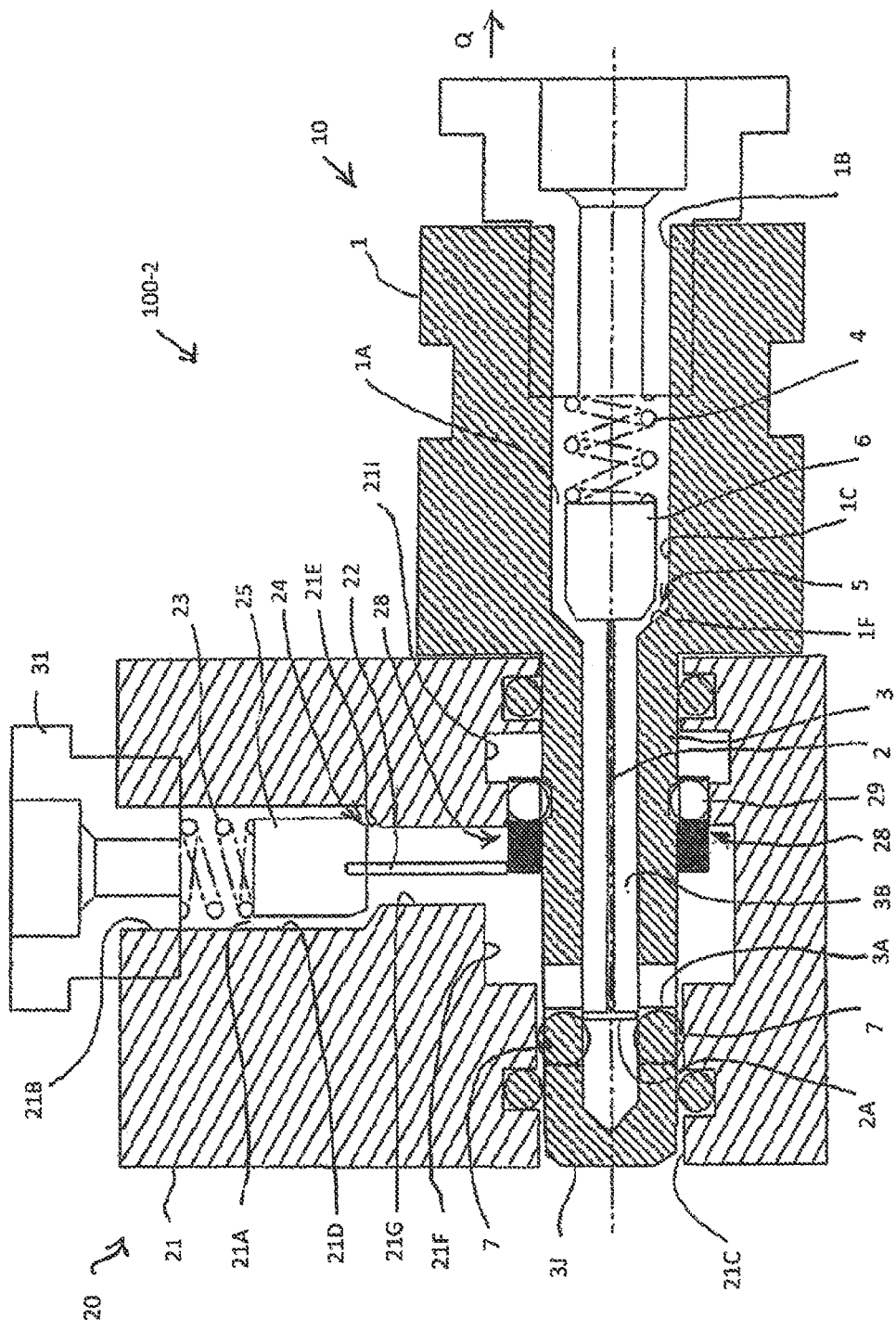
FIG. 8 is an explanatory cross-sectional view of a safety joint according to the third embodiment of the present invention in a state where a plug is connected to a socket.

Next, the third embodiment of the present invention will be described with reference to FIGS. 8 to 12. The safety joint 100-2 of the third embodiment shown in FIGS. 8 to 12 has a support member (rod support member) different from that of the safety joint 100 of the first embodiment and the safety joint 100-1 of the second embodiment. In the following description of the third embodiment, parts different from the first embodiment and the second embodiment will be mainly described. In FIG. 8 showing a state in which the plug 10 and the socket 20 are connected, the socket 20 includes a support member 28 that supports (places) the socket side rod 22 in addition to the socket side valve body 25, the socket side spring 23, and the socket side rod 22, and is configured to immediately shut off the socket side shutoff valve 24 when the connection between the plug 10 and the socket 20 is disconnected. Then, the support member 28 is configured to move (operate) together with the plug 10 when the plug 10 is disengaged from the socket 20 so as not to support (place) the socket side rod, and thereby to shut off the socket side shutoff valve 24.

Figure 9:
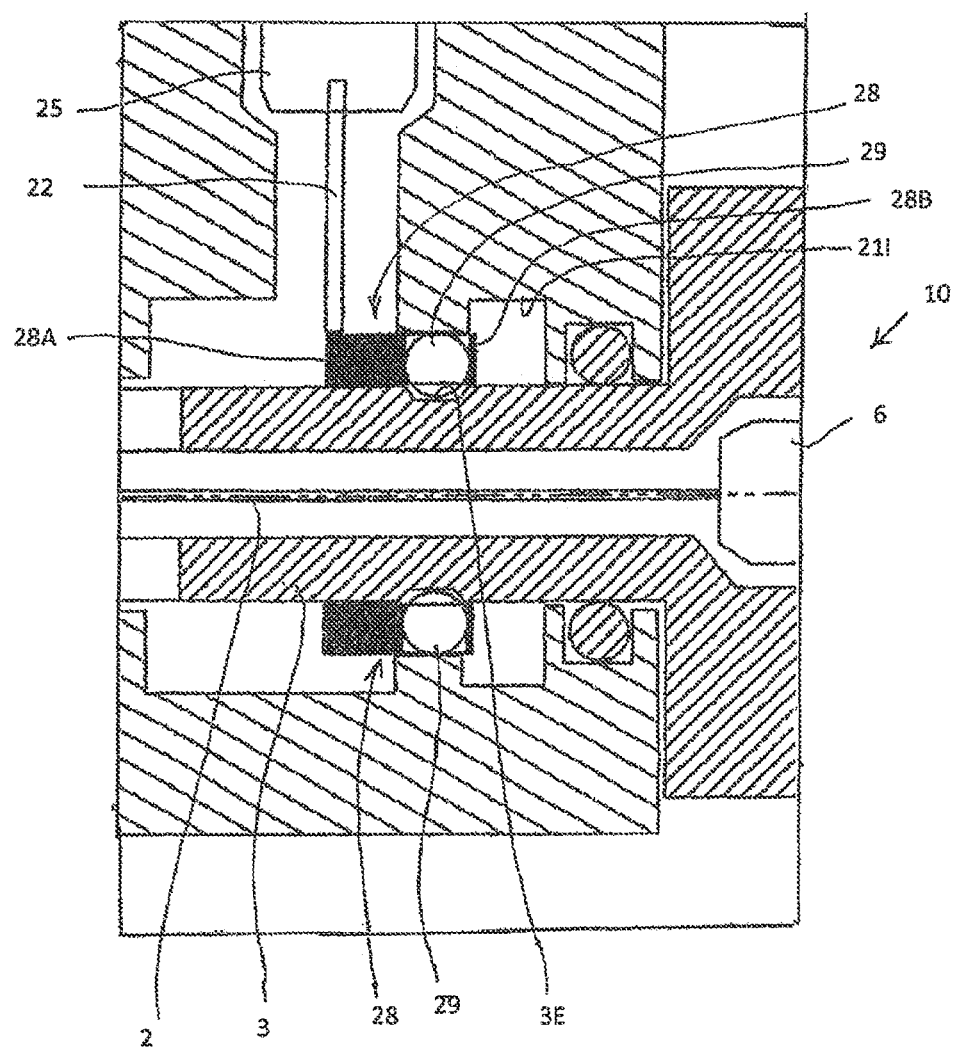
FIG. 9 is an explanatory enlarged view of a support member in the safety joint shown in FIG. 8.

In FIG. 9, which shows an enlarged view of the support member 28, the support member 28 (rod support member) arranged adjacent to the ball 29 has an annular portion 28A and a ball holding portion 28B that hold the ball 29 in between, and the annular portion 28A and the ball holding portion 28B are integrally configured. The ball holding portion 28B is arranged on the plug 10 side (right side in FIGS. 8 and 9) with respect to the annular portion 28A, and holds the ball 29 in the hollow portion. The ball holding portion 28B is provided with openings smaller than the diameter of the ball 29 on both sides (bottom surface and top surface) of the plug side protruding member 3 in the radial direction (vertical direction shown in FIGS. 8 and 9). In the radial direction of the plug side protruding member 3, although a part of the ball 29 protrudes from the ball holding portion 28B, the small-diameter opening is configured so that the entire ball 29 does not come out of the ball holding portion 28B. In FIG. 9, the plug side protruding member 3 is formed with a recess 3E (groove) into which a part of the ball 29 is engaged (inserted). In FIGS. 8 and 9, an opening 21C (through hole) into which the plug side protruding member 3 is inserted is formed in the socket 20 so as to extend in a direction orthogonal to the in-socket flow path 21A, and a large diameter portion 21I is formed in the region of the opening 21C on the plug 10 side of the in-socket flow path 21A. When the plug 10 and the socket 20 are connected as shown in FIG. 8, an end portion of the socket side rod 22 is in contact with the annular portion 28A and is supported (placed) thereon. As a result, the socket side valve body 25 is held in a state of being separated from the valve seat 21E, and the socket side shutoff valve 24 is open. When the plug 10 and the socket 20 are connected, a part of the ball 29 held by the ball holding portion 28B engages with the groove 3E (recess) of the plug side protruding member 3, the portion of the ball 29 opposite to the portion engaged with the groove 3E (outward in the radial direction of the plug side protruding member 3) is in contact with the inner wall surface of the opening 21C of the socket body 21, so that the ball 29 cannot move outward from the radial direction of the plug side protruding member 3 (vertical direction in FIGS. 8 and 9).

As described above, when the plug 10 and the socket 20 are connected as shown in FIG. 8, the socket side shutoff valve 24 is opened, and the hydrogen gas introduction port 21B of the in-socket flow path 21A communicates with the opening portion 21C of the socket body 21 via the socket side valve body accommodating portion 21D, the socket side rod accommodating portion 21G, and the annular ball accommodating space 21F. Then, the hydrogen gas introduction port 21B communicates with the in-plug flow path 1A via the hole 3A formed in the plug side protruding member 3. Similar to the first and second embodiments shown in the figures, the plug side shutoff valve 5 is opened when the plug 10 and the socket 20 are connected, and the in-plug flow path 1A communicates with the hydrogen gas outlet 1B via the internal space 3B of the plug side protruding member 3 and the flow path in the plug side valve body accommodating portion 1C. As a result, the hydrogen gas flowing in from the hydrogen gas introduction port 21B flows out from the hydrogen gas outlet 1B and flows through the filling hose 201 (see FIG. 14).

Figure 10:
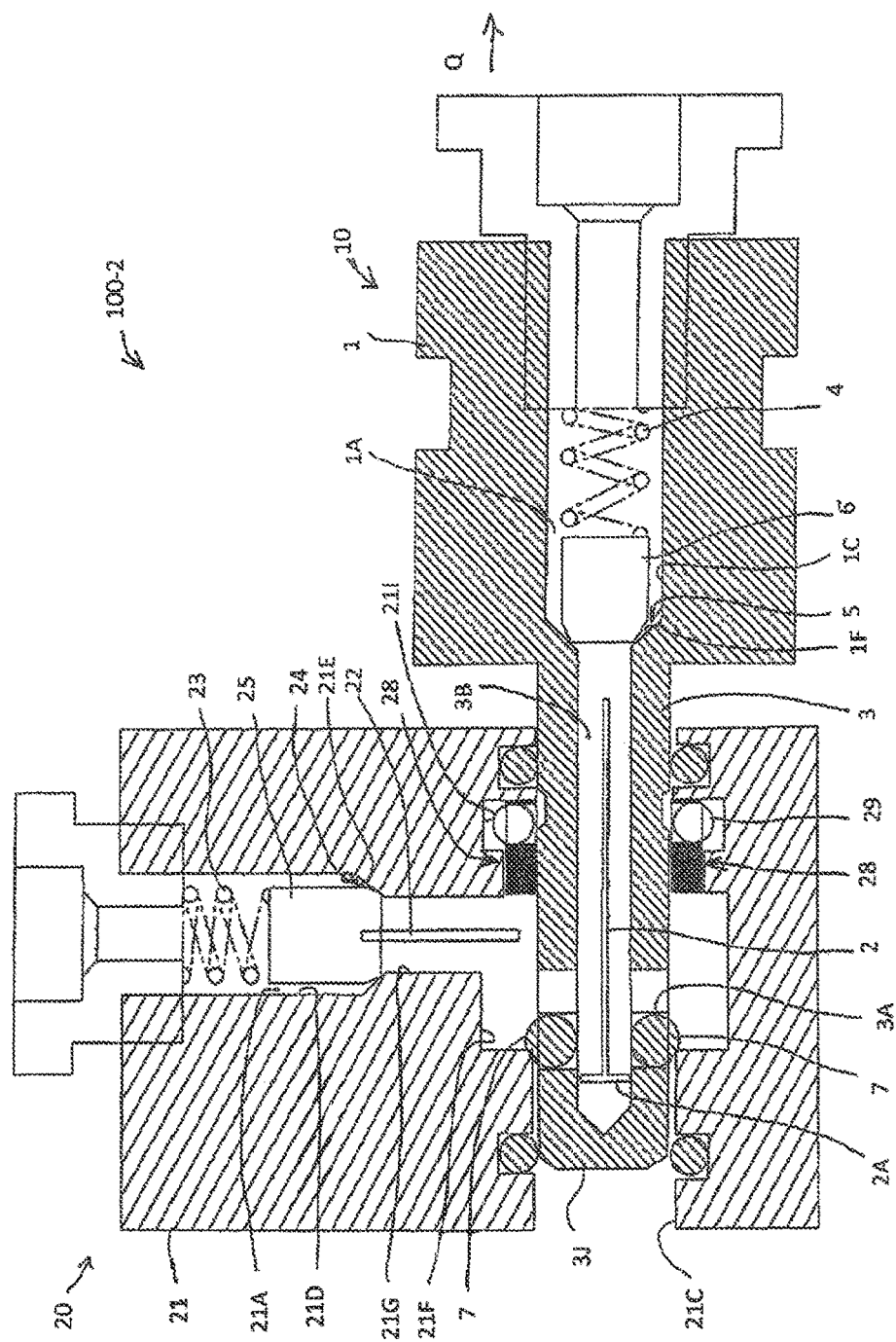
FIG. 10 is an explanatory cross-sectional view showing an initial state in which the plug is disconnected from the socket in the safety joint shown in FIG. 8.

Since when the plug 10 and the socket 20 are connected, a part of the ball 29 is engaged with the groove 3E (recess) of the plug side protruding member 3, as shown in FIG. 10, when the connection between the plug 10 and the socket 20 is released and the plug 10 moves in the direction away from the socket 20 (direction of the arrow Q), along with the ball 29, the annular portion 28A and the ball holding portion 28B of the rod support member 28 also move (rightward) in the arrow Q direction (rightward in FIGS. 8 and 9). When the rod support member 28 moves in the direction of the arrow Q, the socket side rod 22 mounted (supported) on the annular portion 28A of the rod support member 28 is no longer mounted on the annular portion 28A and immediately moves (drops) to the opening 21C side due to the elastic repulsive force of the socket side spring 23. When the socket side rod 22 falls, the socket side valve body 25 is pressed by the socket side spring 23 and instantly sits on the socket side valve seat 21E, and the socket side shutoff valve 24 is immediately closed.

In other words, the socket side rod 22 supported by the annular portion 28A in a state where the plug 10 and the socket 20 are connected, when the plug 10 starts to come off from the socket 20, the rod support member 28 moves in the direction of the arrow Q (to the right in FIG. 10), and immediately disengages from the annular portion 28A and falls toward the opening 21C, so that the socket side shutoff valve 24 is instantly closed at the initial stage when the plug 10 is disconnected from the socket 20. Closing the socket side shutoff valve 24 prevents hydrogen gas flowing into the socket 20 from flowing out to the outside of the socket 20. Then, by the same mechanism as in the first embodiment and the second embodiment, at the initial stage when the plug 10 is disengaged from the socket 20, the plug side shutoff valve 5 is instantly closed to prevent hydrogen gas from flowing out to the outside of the plug 10. With this, in the third embodiment shown in FIGS. 8 to 12, in the initial stage when the plug 10 comes off the socket 20, since the socket side shutoff valve 24 and the plug side shutoff valve 5 are closed instantaneously, hydrogen gas is prevented from flowing out from the safety joint 100-2.

In FIG. 10 showing the initial state in which the plug 10 is disengaged from the socket 20, as a result of the plug 10 moving in the direction of the arrow Q with respect to the socket 20, the ball 29 reaches the large diameter portion 21I. Moving the plug 10 in the direction of the arrow Q causes the ball 29 to be pressed by the annular portion 28A and the inner wall surface of the large diameter portion 21I, so that the ball 29 that has reached the large diameter portion 21I due to the pressing force moves outward in the radial direction (vertical direction in FIGS. 9 and 10), and is removed from the groove 3E (recess: FIG. 9) of the plug side protruding member 3 and is housed in the large diameter part 21I. At that time, the ball holding portion 28B contacts with the inner wall surface of the large diameter portion 21I. As a result of the ball 29 being disengaged from the groove 3E (recess) and accommodated in the large diameter portion 21I, since the rod support member 28 (annular portion 28A and ball holding portion 28B) moves relative to the plug 10 (becomes movable relative to the plug 10), the rod support member 28 does not interfere with (the movement: the movement in the direction of the arrow Q in FIG. 10) of the plug 10, the ball 29 does not interfere with the plug 10, and as shown in FIGS. 11 and 12, the plug 10 can move in the direction of the arrow Q and can be disengaged from the socket 20.

Figure 11:
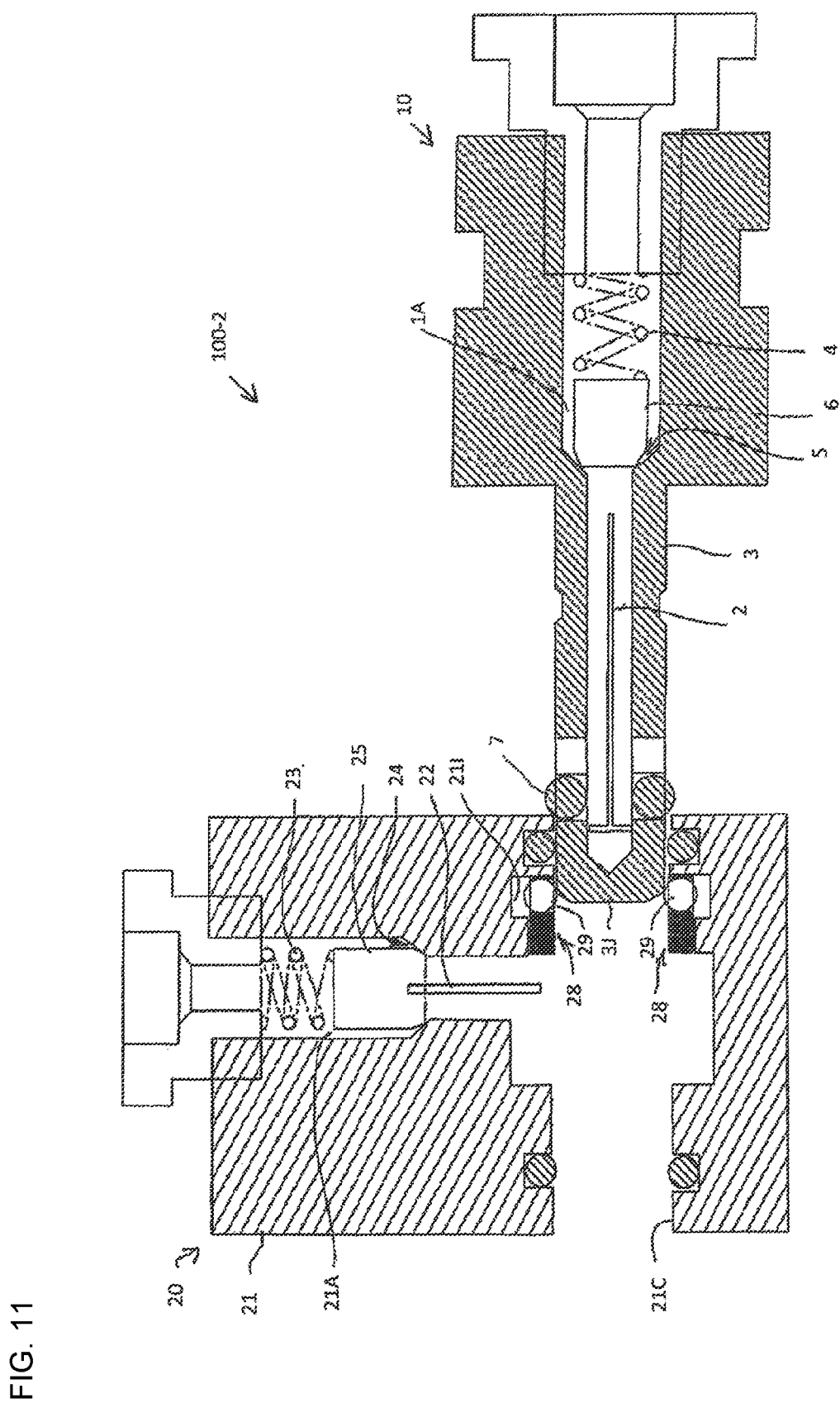
FIG. 11 is an explanatory cross-sectional view showing the state just before the plug is disconnected from the socket in the safety joint shown in FIG. 8.
Figure 12:
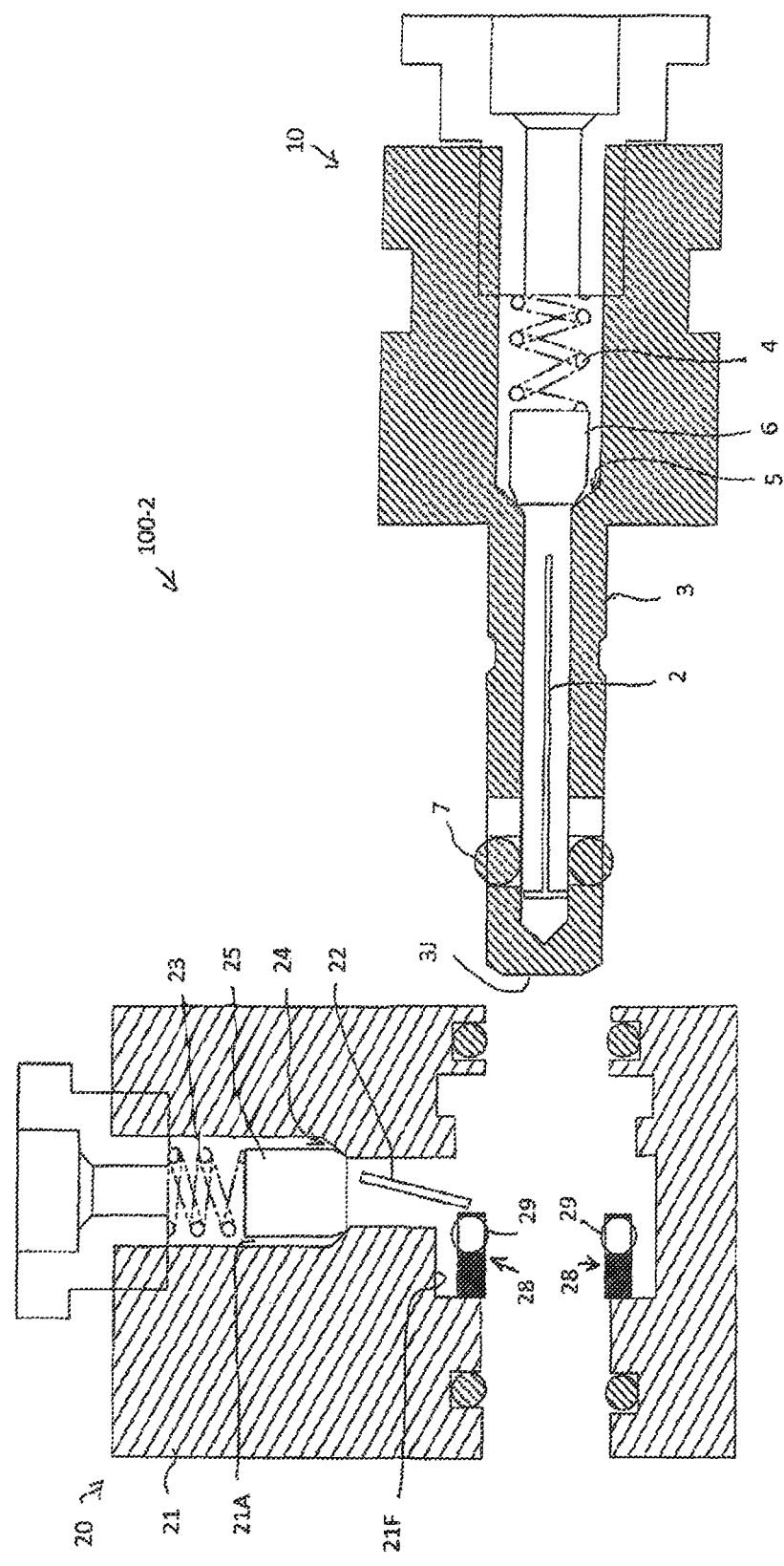
FIG. 12 is an explanatory cross-sectional view of a state in which the plug is disconnected from the socket in the safety joint shown in FIG. 8.

Here, since the plug 10 is instantly pulled out of the socket 20, the state of FIG. 10 is instantly changed to the state of FIG. 11, and the state of FIG. 11 is instantly changed to the state of FIG. 12 also. In the state of FIG. 11, the tip of the plug side protruding member 3 is slightly inserted into the opening 21C of the socket body 21, and the hydrogen gas existing in the space from the socket side shutoff valve 24 to the opening 21C is discharged from the end of the opening 21C on the side separated from the plug 10 (left side of FIGS. 11 and 12). Then, as the hydrogen gas is released, as shown in FIG. 12, the ball 29 and the rod support member 28 (circular part 28A, ball holding part 28B) move to the annular space 21F on the side separated from the plug 10 in the opening 21C. Other configurations and operational effects in the third embodiment shown in FIGS. 8 to 12 are the same as those of the embodiments shown in FIGS. 1 to 7.

Figure 13:
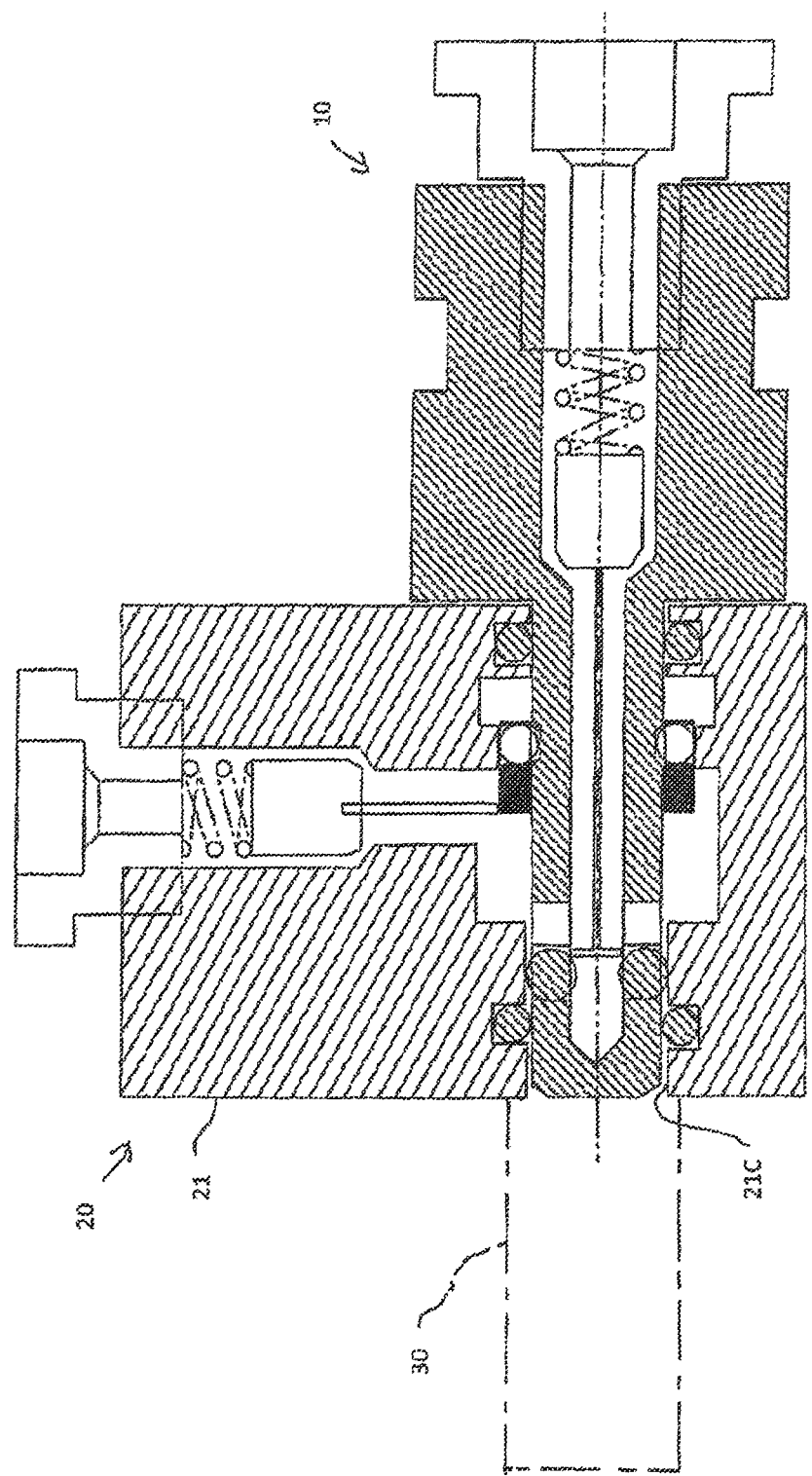
FIG. 13 is a cross-sectional view showing a safety joint according to a modification example of the embodiment.

A modified example of the illustrated embodiment will be described with reference to FIG. 13. In FIG. 13, a silencer 30 is provided on the side (left side in FIG. 13) of the opening portion 21C of the socket body 21 separated from the plug 10. Providing the silencer 30 allows the noise when the plug 10 comes out of the socket 20 to be reduced. In FIG. 13, although the silencer 30 is provided in the third embodiment shown in FIGS. 8 to 12, the silencer 30 can also be provided in the first embodiment shown in FIGS. 1 to 3 and the second embodiment shown in FIGS. 4 to 7.

Since the embodiments shown in the drawings are merely examples, and the embodiments do not limit the technical scope of the present invention.

DESCRIPTION OF THE REFERENCE NUMERALS 1 plug body
1A in-plug passage
2 plug side rod
3 plug side protruding member
3C groove (opening, groove of plug side protruding member)
3D groove (opening, groove of plug side protruding member)
3E recess (opening, recess of plug side protruding member)
4 plug side spring (elastic member)
5 plug side shutoff valve
6 plug side valve body
10 plug (nozzle side member)
20 socket (filling apparatus side member)
21 socket body
21A in-socket passage
21C opening (through hole)
21H, 21I large diameter portions
22 socket side rod (rod-shaped member)
23 socket side spring (elastic member)
24 socket side shutoff valve
25 socket side valve body
26, 27, 28 rod support members
26A protrusion
26B notch
26C flat portion
26D disk-shaped member
27A protrusion
27B flat portion
27C taper portion (inclined portion)
27D rod mounting portion
27E inclined portion
27F deformation member
28A circular portion
28B ball holding portion
29 ball
100, 100-1, 100-2 safety joints

The invention claimed is:
1. A safety joint including:
a cylindrical nozzle side member with a flow path formed inside, a shutoff valve of the nozzle side member being configured to open when the nozzle side member is connected to a filling apparatus side member; and
the filling apparatus side member with a cylindrical shape, a flow path disposable in communication with the flow path of the nozzle side member is formed in the filling apparatus side member and a shutoff valve of the filling apparatus side member is configured to open when the filling apparatus side member is connected to the nozzle side member;
and when the nozzle side member is disconnected from the filling apparatus side member, the shutoff valves of the nozzle side member and the filling apparatus side member are configured to close, wherein
a mechanism for closing the shutoff valve of the filling apparatus side member includes:
an elastic member, of the filling apparatus side member, for urging a filling apparatus side valve body;
a rod-shaped member connected to the filling apparatus side valve body; and
a support member for supporting the rod-shaped member, the support member having an annular portion and a ball holding portion configured to hold a ball in between, wherein
said support member moves together with the nozzle side member to a state where the support member does not support the rod-shaped member when the nozzle side member is disconnected from the filling apparatus side member,
when the nozzle side member and the filling apparatus side member are connected with each other, the end portion of the rod-shaped member contacts with the annular portion and is supported thereon;
the nozzle side member having a protruding portion including a recess configured to receive part of the ball;
the filling apparatus side member having an opening sized to facilitate insertion of the protruding portion of the nozzle side member therein, the opening extending in a direction orthogonal to the flow path of the filling apparatus side member, a large diameter portion being formed in a region on the nozzle side of the flow path of the filling apparatus side member; and when the nozzle side member is disconnected from the filling apparatus side member and the ball reaches the large diameter portion, the ball disengages from a recess and moves into the large diameter portion.

2. A safety joint comprising:
a cylindrical nozzle side member having:
  an internal flow path; and
  a shutoff valve;
a filling apparatus side member having:
  a flow path disposable in communication with the flow path of the nozzle side member;
  a shutoff valve having a valve body;
  a mechanism for closing the shutoff valve of the filling apparatus side member includes:
    an elastic member for urging the valve body in a prescribed direction;
    a rod-shaped member connected to the valve body;
    a ball; and
    a support member having an annular portion and a ball holding portion configured to hold the ball, the support member being configured to move together with the nozzle side member to a state where the support member does not support the rod-shaped member when the nozzle side member is disconnected from the filling apparatus side member;
    an end portion of the rod-shaped member being configured to contact with the annular portion to be supported thereon when the nozzle side member and the filling apparatus side member are connected with each other;
the nozzle side member having a protruding portion including a recess configured to receive part of the ball;
the filling apparatus side member having an opening sized to facilitate insertion of the protruding portion of the nozzle side member therein, the opening extending in a direction orthogonal to the flow path of the filling apparatus side member, a large diameter portion being formed in a region on the nozzle side of the flow path of the filling apparatus side member;

when the nozzle side member is disconnected from the filling apparatus side member and the ball reaches the large diameter portion, the ball disengages from a recess and moves into the large diameter portion;

the shutoff valves being configured to transition to their respective open positions when the nozzle side member is connected to the filling apparatus side member;

the shutoff valves being configured to transition to their respective closed positions when the nozzle side member is disconnected from the filling apparatus side member.

3. A filling apparatus side member for use with a cylindrical nozzle side member having an internal flow path, the filling apparatus side member comprising:
  a main body connectable with the nozzle side member, the main body having a flow path disposable in communication with the internal flow path of the nozzle side member;
  a shutoff valve having a valve body, the shutoff valve being configured to transition to an open position when the main body is connected to the nozzle side member, and to a closed position when the main body is disconnected from the nozzle side member is disconnected from the filling apparatus side member;
  a rod-shaped member connected to the valve body;
  a ball; and
  a support member having an annular portion and a ball holding portion configured to hold the ball, the support member being configured to move together with the nozzle side member to a state where the support member does not support the rod-shaped member when the main body is disconnected from the nozzle side member;
  an end portion of the rod-shaped member being configured to contact with the annular portion to be supported thereon when the main body is connected with nozzle side member.

* * * * *